(12) United States Patent
Kallas et al.

(10) Patent No.: US 11,941,633 B2
(45) Date of Patent: Mar. 26, 2024

(54) SYSTEM FOR IDENTIFYING POINTS OF COMPROMISE

(71) Applicant: U.S. Bancorp, National Association, Minneapolis, MN (US)

(72) Inventors: Christopher Kallas, Minneapolis, MN (US); Xiaoqiao Wei, Minneapolis, MN (US)

(73) Assignee: U.S. Bancorp, National Association, Minneapolis, MN (US)

( * ) Notice: Subject to any disclaimer, the term of this patent is extended or adjusted under 35 U.S.C. 154(b) by 692 days.

(21) Appl. No.: 17/082,664

(22) Filed: Oct. 28, 2020

(65) Prior Publication Data

US 2021/0073820 A1     Mar. 11, 2021

Related U.S. Application Data

(63) Continuation-in-part of application No. 16/562,724, filed on Sep. 6, 2019, now Pat. No. 11,468,447.

(51) Int. Cl.
*G06Q 20/40* (2012.01)
*G11C 11/41* (2006.01)

(52) U.S. Cl.
CPC ..... *G06Q 20/4016* (2013.01); *G06Q 20/4015* (2020.05); *G11C 11/41* (2013.01)

(58) Field of Classification Search
CPC ........................... G06Q 10/06; G06Q 20/4016
See application file for complete search history.

(56) References Cited

U.S. PATENT DOCUMENTS

| 5,884,289 | A | 3/1999 | Anderson et al. |
|---|---|---|---|
| 6,094,643 | A | 7/2000 | Anderson et al. |
| 8,036,967 | B2 | 10/2011 | Adams |
| 8,386,381 | B1 | 2/2013 | Barton et al. |
| 8,473,415 | B2 | 6/2013 | Siegel et al. |
| 8,600,872 | B1 * | 12/2013 | Yan ........................ G06Q 40/00 705/38 |
| 8,612,340 | B1 | 12/2013 | Yan |
| 9,563,921 | B2 | 2/2017 | Shi et al. |
| 10,115,153 | B2 | 10/2018 | Zoldi et al. |
| 10,284,590 | B2 | 5/2019 | Ramos de Araujo et al. |
| 10,290,001 | B2 | 5/2019 | Adjaoute |
| 2005/0055373 | A1 * | 3/2005 | Forman ................. G06F 21/55 |
| 2009/0125543 | A1 | 5/2009 | Patil et al. |
| 2009/0234899 | A1 | 9/2009 | Kramer |
| 2010/0106692 | A1 | 4/2010 | Moloney |
| 2015/0339673 | A1 | 11/2015 | Adjaoute |
| 2016/0132886 | A1 | 5/2016 | Burke et al. |

(Continued)

FOREIGN PATENT DOCUMENTS

GB     2447073 A   *   9/2008   ........... G06K 9/3275

*Primary Examiner* — Hao Fu
(74) *Attorney, Agent, or Firm* — Foley & Lardner LLP

(57) ABSTRACT

The disclosure describes an apparatus having programmed instructions that when executed cause the apparatus to receive, via a communication network, information regarding suspicious fraud activity at a first location involving a plurality of transaction cards; monitor changes over a first time interval to received information regarding suspicious fraud activity at the first location; and identify a point-of-compromise (POC) location based on monitored changes surpassing a threshold indicating suspicious fraud activity at the first location over the first time interval.

20 Claims, 24 Drawing Sheets

(56) References Cited

U.S. PATENT DOCUMENTS

| | | |
|---|---|---|
| 2017/0206089 A1 | 7/2017 | Hosoi |
| 2017/0237759 A1* | 8/2017 | Bell .................... H04L 63/1425 726/23 |
| 2018/0103038 A1* | 4/2018 | Burke ................. G06F 16/9038 |
| 2019/0188721 A1 | 6/2019 | Wiese et al. |
| 2020/0311736 A1* | 10/2020 | Song .................. G06Q 20/4014 |
| 2020/0372097 A1* | 11/2020 | Mattina ................... G06F 17/16 |

* cited by examiner

|  | L1 | L2 | L3 | L4 | L5 | L6 | L7 | L8 |
|---|---|---|---|---|---|---|---|---|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 1 | 0 | 0 | 0 | 1 | 0 | 0 | 0 |
| C6 | 0 | 1 | 1 | 0 | 0 | 1 | 1 | 1 |
| Total Cards | 21 | 45 | 33 | 8 | 26 | 40 | 47 | 52 |

FIG. 5A

|    | L1 | L2 | L3 | L4 | L5 | L6 | L7 | L8 |
|----|----|----|----|----|----|----|----|----|
| C1 | 0  | 0  | 0  | 1  | 0  | 1  | 1  | 0  |
| C2 | 1  | 0  | 1  | 0  | 0  | 0  | 0  | 0  |
| C3 | 0  | 1  | 0  | 1  | 1  | 0  | 0  | 0  |
| C4 | 0  | 0  | 0  | 0  | 0  | 1  | 1  | 1  |
| C5 | 1  | 0  | 0  | 0  | 1  | 0  | 0  | 0  |
| C6 | 0  | 1  | 1  | 0  | 0  | 1  | 1  | 1  |
| Total Cards | 21 | 47 | 33 | 12 | 26 | 40 | 47 | 52 |

FIG. 5B

|  | L1 | L2 | L3 | L4 | L5 | L6 | L7 | L8 |
|---|---|---|---|---|---|---|---|---|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 2 | 0 | 0 | 0 | 2 | 0 | 0 | 0 |
| C6 | 0 | 1 | 1 | 0 | 0 | 1 | 1 | 1 |
| Total Cards | 21 | 45 | 33 | 8 | 26 | 40 | 47 | 52 |

FIG. 5C

|  | L1 | L2 | L3 | L4 | L5 | L6 | L7 | L8 |
|---|---|---|---|---|---|---|---|---|
| C1 | 1 | 0 | 0 | 2 | 0 | 2 | 2 | 0 |
| C2 | 1 | 0 | 1 | 0 | 0 | 0 | 0 | 0 |
| C3 | 0 | 1 | 0 | 1 | 1 | 1 | 0 | 0 |
| C4 | 0 | 0 | 0 | 0 | 0 | 0 | 1 | 1 |
| C5 | 1 | 0 | 0 | 0 | 1 | 0 | 0 | 0 |
| C6 | 0 | 1 | 1 | 0 | 0 | 1 | 1 | 1 |
| Total Cards | 21 | 45 | 33 | 8 | 26 | 40 | 47 | 52 |

FIG. 5D

|   | L1 | L2 | L3 | L4 | L5 | L6 | L7 | L8 | L9 |
|---|----|----|----|----|----|----|----|----|----|
| C1 | 0 | 0 | 0 | 1 | 0 | 1 | 1 | 0 | 0 |
| C2 | 1 | 0 | 1 | 0 | 0 | 0 | 0 | 0 | 1 |
| C3 | 0 | 1 | 0 | 1 | 1 | 0 | 0 | 0 | 0 |
| C4 | 0 | 0 | 0 | 0 | 0 | 1 | 1 | 1 | 0 |
| C5 | 1 | 0 | 1 | 0 | 1 | 0 | 0 | 0 | 0 |
| C6 | 0 | 1 | 0 | 0 | 0 | 1 | 1 | 1 | 1 |
| Total Cards | 21 | 45 | 33 | 8 | 26 | 40 | 47 | 52 | 66 |

FIG. 5E

| | L1 | L2 | L3 | L4 | L5 | L6 | L7 | L8 |
|---|---|---|---|---|---|---|---|---|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 1 | 1 | 0 | 0 | 1 | 0 | 0 | 0 |
| C6 | 0 | 0 | 1 | 1 | 0 | 1 | 1 | 1 |
| C7 | 0 | 0 | 1 | 0 | 0 | 0 | 0 | 1 |
| Total Cards | 21 | 45 | 34 | 9 | 26 | 40 | 47 | 53 |

FIG. 5F

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 0 | 1 | 0 | 1 | 1 | 0 | 3 | 0 |
| C2 | 1 | 0 | 1 | 0 | 0 | 0 | 0 | 0 | 2 | 0 |
| C3 | 0 | 1 | 0 | 1 | 1 | 0 | 0 | 0 | 3 | 0 |
| C4 | 0 | 0 | 0 | 0 | 0 | 1 | 1 | 1 | 3 | 0 |
| C5 | 1 | 1 | 0 | 0 | 1 | 0 | 0 | 0 | 2 | 0 |
| C6 | 0 | 0 | 1 | 1 | 0 | 1 | 1 | 1 | 5 | 0 |
| C7 | 0 | 0 | 1 | 1 | 0 | 0 | 0 | 2 | 3 | 0 |
| POC Indicator | 2 | 2 | 3 | 3 | 2 | 3 | 3 | 2 | n/a | n/a |
| POC Acceleration | 0 | 0 | 0 | 0 | 0 | 0 | 0 | 0 | n/a | n/a |
| Total Cards | 21 | 45 | 34 | 9 | 26 | 40 | 47 | 53 | n/a | n/a |

| | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 1 | 2 | 0 | 2 | 1 | 0 | *6* | *1* |
| C2 | 1 | 0 | 1 | 0 | 0 | 0 | 0 | 0 | 2 | 0 |
| C3 | 0 | 2 | 1 | 2 | 1 | 0 | *1* | 0 | *7* | *1.33* |
| C4 | 0 | 0 | 0 | 0 | 0 | 1 | 1 | 1 | 3 | 0 |
| C5 | 1 | 0 | 2 | 0 | 0 | 0 | 0 | 0 | 2 | 0 |
| C6 | 0 | 2 | 1 | 0 | 0 | 2 | 2 | 2 | *10* | *1* |
| C7 | 0 | 0 | 1 | 1 | 2 | 0 | 0 | 1 | 3 | 0 |
| POC Indicator | 2 | 4 | 5 | 5 | 2 | 5 | 4 | 3 | n/a | n/a |
| POC Acceleration | 0 | 1 | *0.667* | *0.667* | 0 | *0.667* | *0.334* | *0.5* | n/a | n/a |
| Total Cards | 21 | 45 | 34 | 9 | 26 | 40 | 47 | 53 | n/a | n/a |

620

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 1 | 2 | 0 | 2 | 1 | 0 | 6 | 0 |
| C2 | 1 | 0 | 1 | 0 | 0 | 0 | 0 | 0 | 2 | 0 |
| C3 | 0 | 2 | 1 | 2 | 1 | 0 | 1 | 0 | 7 | 0 |
| C4 | 0 | 0 | 0 | 0 | 0 | 2 | 2 | 2 | 6 | 1 |
| C5 | 1 | 0 | 2 | 0 | 1 | 0 | 0 | 0 | 2 | 0 |
| C6 | 0 | 2 | 2 | 0 | 0 | 2 | 2 | 2 | 10 | 0 |
| C7 | 0 | 0 | 1 | 1 | 0 | 0 | 0 | 1 | 3 | 0 |
| POC Indicator | 2 | 4 | 5 | 5 | 2 | 6 | 6 | 5 | n/a | n/a |
| POC Acceleration | 0 | 0 | 0 | 0 | 0 | 0.3 | 0.5 | 0.667 | n/a | n/a |
| Total Cards | 21 | 45 | 34 | 9 | 26 | 40 | 47 | 53 | n/a | n/a |

630

|    | CFI0 | CFI1 | CFI2 | CFI3 | CFI4 | CFI5 | CFI6 | CFI7 |
|----|------|------|------|------|------|------|------|------|
| C1 | 1    | 2    | 3    | 4    | 4    | 5    | 6    | 7    |
| C2 | 1    | 1    | 2    | 2    | 2    | 2    | 3    | 3    |
| C3 | 1    | 1    | 1    | 2    | 2    | 3    | 4    | 5    |
| C4 | 1    | 2    | 2    | 2    | 2    | 2    | 2    | 3    |
| C5 | 1    | 1    | 1    | 1    | 1    | 1    | 1    | 1    |
| C6 | null | null | 1    | 1    | 2    | 2    | 2    | 2    |

| | Total Cards | POC0 | PAI0 | POC1 | PAI1 | POC2 | PAI2 | POC3 | PAI3 |
|---|---|---|---|---|---|---|---|---|---|
| L1 | 4459 | 0.00292 | | 0.00336 | 0.1507 | 0.00538 | 0.6919 | 0.00695 | 0.5377 |
| L2 | 24838 | 0.00004 | | 0.00004 | 0 | 0.00004 | 0 | 0.00008 | 1 |
| L3 | 1565 | 0.00317 | | 0.00317 | 0 | 0.00317 | 0 | 0.00317 | 0 |
| L4 | 3601 | 0.00028 | | 0.00028 | 0 | 0.00056 | 1 | 0.00083 | 1.9643 |
| L5 | 17532 | 0.00006 | | 0.00006 | 0 | 0.00006 | 0 | 0.00006 | 0 |
| L6 | 39855 | 0.00003 | | 0.00003 | 0 | 0.00008 | 1.6667 | 0.0001 | 0.6667 |

| 2019-02-10 | 2019-02-17 | 2019-02-24 | 2019-03-03 | 2019-03-10 | 2019-03-17 | 2019-03-24 | 2019-03-31 | 2019-04-14 | 2019-04-21 | 2019-05-12 | 2019-05-19 | 2019-06-09 |
|---|---|---|---|---|---|---|---|---|---|---|---|---|
| 15 | 34 | 22 | 21 | 15 | 11 | 8 | 5 | 6 | 6 | 5 | 4 | 5 |

| 2018-08-12 | 2018-08-26 | 2018-09-02 | 2018-09-16 | 2018-10-07 | 2018-10-14 | 2018-11-11 | 2018-12-02 | 2018-12-09 | 2018-12-16 | 2019-01-27 | 2019-02-10 | 2019-02-24 | 2019-03-03 |
|---|---|---|---|---|---|---|---|---|---|---|---|---|---|
| 6 | 9 | 6 | 6 | 6 | 6 | 7 | 7 | 12 | 10 | 12 | 6 | 11 | 9 |
| 2019-03-03 | 2019-03-10 | 2019-03-17 | 2019-03-24 | 2019-03-31 | 2019-05-05 | 2019-05-12 | 2019-05-19 | 2019-05-26 | 2019-06-02 | 2019-06-09 | 2019-06-16 | 2019-06-23 | 2019-06-30 |
| 9 | 9 | 16 | 9 | 10 | 38 | 32 | 24 | 19 | 26 | 26 | 23 | 16 | 13 |

SYSTEM FOR IDENTIFYING POINTS OF COMPROMISE

CROSS-REFERENCE TO RELATED APPLICATION

This application claims priority under 35 U.S. § 120 as a continuation-in-part of the U.S. Non-Provisional application Ser. No. 16/562,724, filed Sep. 6, 2019, titled "SYSTEM FOR IDENTIFYING POINTS OF COMPROMISE," the entire contents of which are incorporated herein by reference for all purposes.

BACKGROUND

The following description is provided to assist the understanding of the reader. None of the information provided or references cited is admitted to be prior art.

Credit and debit cards play a major role in financial transactions throughout the world. However, traditional credit and debit cards struggle with a number of drawbacks. For example, the magnetic stripe information can be compromised by a skimmer device placed in a point-of-sale location or card information can be stolen using a malware breach in a merchant's system. Compromised cards can then be used for fraudulent transactions. Failure to timely detect a point of compromise where card information is illegitimately obtained can result in more and more cards being used for fraud. Such activity causes significant business loss to card issuers. Furthermore, such fraud damages the trust and relationships between card issuers and customers.

Heretofore, attempts have been made to identify points of compromise in the financial card network using computer systems but such systems have not succeeded to quickly identify locations where card information is compromised and fraudulently used.

SUMMARY

In accordance with some aspects of the present disclosure, a system is disclosed to identify points of compromise using monitoring and analysis of interactions between the fraud cards and the points of sale. For purposes of this description, a fraud card is any credit and/or debit card including personal, business, and corporate, that had at least one known or suspicious fraud transaction within a certain time period, such as six months. The time window of the recent transactions is adjustable, depending on factors including the number of transactions, the risks of potential points-of-compromise, etc. The system selects a time window of recent transactions from which it cumulates fresh fraud transactions to monitor and detect any possible points-of-compromise.

In accordance with some aspects of the present disclosure, an apparatus includes programmed instructions that when executed cause the apparatus to receive, via a communication network, information regarding suspicious fraud activity at a first location involving a plurality of transaction cards; monitor changes over a first time interval to received information regarding suspicious fraud activity at the first location; and identify a point-of-compromise (POC) location based on monitored changes surpassing a threshold indicating suspicious fraud activity at the first location over the first time interval.

The received fraud transaction information can be arranged in a first two-dimensional matrix at a first time interval and in a second two-dimensional matrix at a second time interval. The apparatus can then determine from comparing data in the first two-dimensional matrix and the second two-dimensional matrix a point of compromise (POC) indicator, a POC acceleration indicator, and a card fraud acceleration indicator. The apparatus can then use these indicators to present a candidate POC location.

In accordance with some other aspects of the present disclosure, a computerized method is disclosed. The method includes collecting location data for suspicious fraud transactions involving a plurality of transaction cards over a first time window; repeating the collecting operations over additional time windows; constructing a three-dimensional matrix using collected locations, associated transaction cards, and time windows; updating the three-dimensional matrix after each new time window; and generating from the three-dimensional matrix at each update a candidate point-of-compromise (POC) location.

In accordance with yet other aspects of the present disclosure, a non-transitory computer readable media with computer-executable instructions embodied thereon is disclosed. The instructions when executed by a processor of a system cause a system to perform a process. The process includes collecting location data for suspicious fraud transactions over a first time window; collecting location data for non-fraud transactions over the first time window; repeating the collecting operations over additional time windows; constructing a three-dimensional matrix using collected locations, associated transaction cards, and time windows; updating the three-dimensional matrix after each new time window; and generating from the three-dimensional matrix at each update a point-of-compromise (POC) indicator, a POC acceleration indicator, and a card fraud acceleration indicator.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 5A is a reference matrix of transaction cards and locations for a particular time interval in accordance with some embodiments of the present disclosure.

FIG. 5B is a newly generated matrix for a subsequent time period after the time period shown in FIG. 5A where additional transactions occurred, but no new fraudulent transactions occurred.

FIG. 5C is a newly generated matrix for yet another subsequent time period after the time period shown in FIG. 5A where new fraudulent transactions occurred at locations where fraudulent transactions have occurred before.

FIG. 5D is a newly generated matrix for another subsequent time period after the time period shown in FIG. 5A where new fraudulent transactions for a specific card/location pair occurred, but there had previously been fraudulent transactions on that card and at that location.

FIG. 5E is a newly generated matrix for a subsequent time period after the time period shown in FIG. 5A where new fraudulent transactions occurred at a new location, but no new cards had fraudulent transactions.

FIG. 5F is a newly generated matrix for a subsequent time period after the time period shown in FIG. 5A where new fraudulent transactions occurred on new cards, but at locations that had previous fraudulent transactions.

FIGS. 6A-6C show multiple matrices from several subsequent time intervals which are used to generate point-of-compromise indicators, point-of-compromise acceleration indicators, and card fraud indicators.

FIG. 7A depicts an example card fraud indicator (CFI) trend table.

FIG. 7B depicts an example POC (points-of-compromise) & POC acceleration indicator (PAI) trend table.

FIG. 8B depicts an example sub-list associated with the mass count plot.

FIG. 8C depicts an example sub-list associated with the mass count plot.

Figure 1:
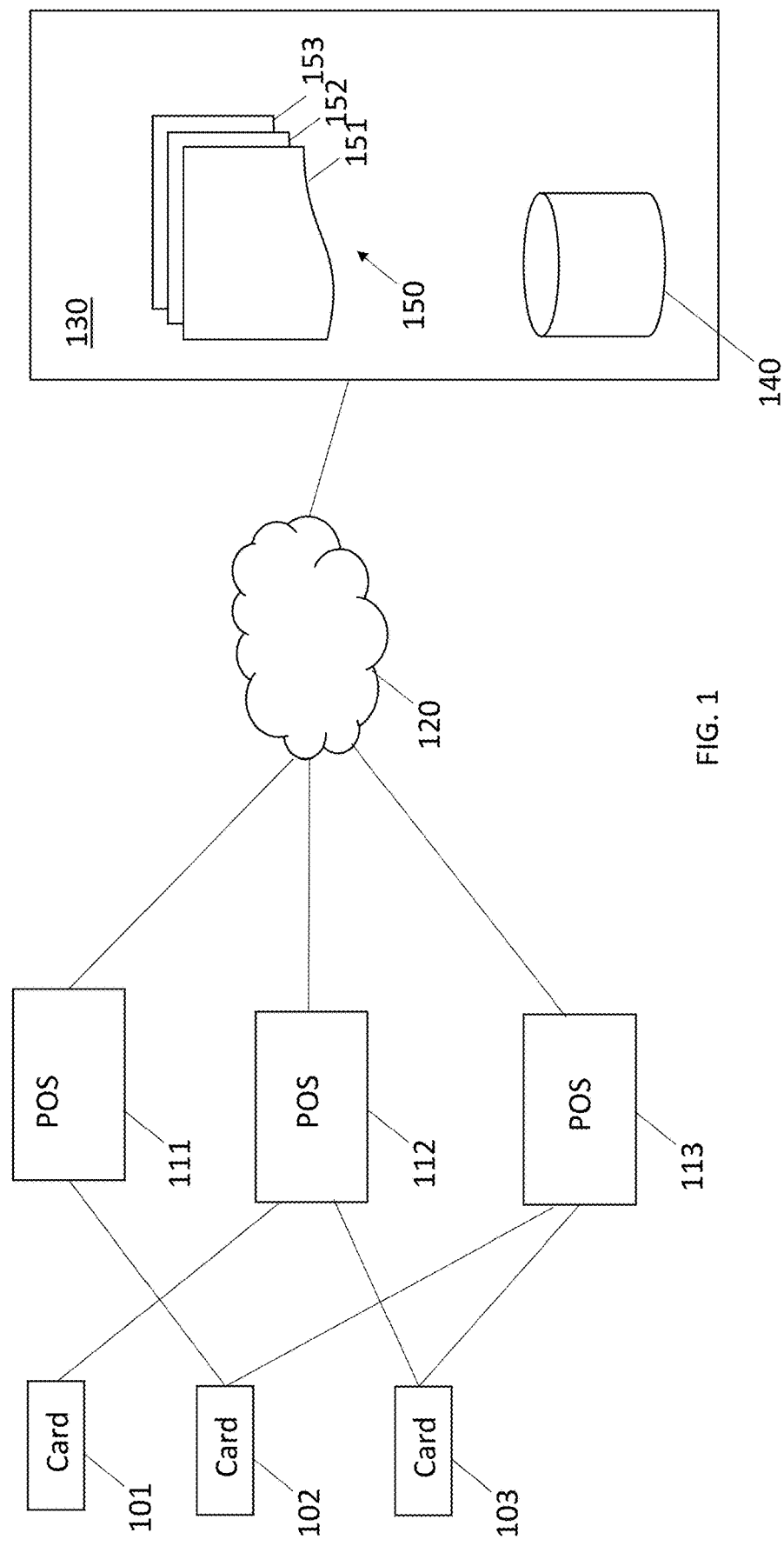
FIG. 1 is an example block diagram of a networked transaction system in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a real-time point-of-compromise detection system having a point-of-compromise detection server in communication with points-of-sale devices through a network. The communication between the point-of-compromise detection server and the points-of-sale devices may be facilitated through an exchange application located at the point-of-sale device and on the point-of-compromise detection server. A variety of management and non-management related operations may be performed on the point-of-compromise detection system.

Exemplary embodiments described herein provide a point-of-compromise detection system that can automatically determine which points-of-sale devices and cards may be possible points-of-compromise. These points-of-compromise could have malware or physical devices that steal the magnetic stripe information from bank cards. Detecting these problematic point-of-sale locations can lead to investigation and repair of the point-of-sale. Similarly, bank cards such as credit or debit cards can be determined to be compromised. These compromised cards can be deactivated or de-authorized in order to prevent future fraudulent transactions. More specifically, the point-of-compromise detection system can use data analysis over intervals of time to determine which locations and cards are likely points-of-compromise, decreasing fraudulent transactions.

According to an exemplary embodiment, the point-of-compromise detection system can identify points-of-compromise, whether the points-of-compromise are compromised points-of-sale devices or compromised bank cards. The point-of-compromise detection system can determine which point-of-sale locations may have a card skimmer or a malware problem that is stealing card magnetic strip information. The point-of-compromise detection system can generate indicators based on the frequency of fraudulent transactions and the total number of transactions over specific time intervals. One indicator is the POC indicator which is helpful for identifying POCs with fewer total card transactions. Additionally, POC indicators are updated when the card is used in a fraudulent or suspicious transaction at another location. That way POC indicators can also be used to find POCs even when the card is not frequently used at the same location.

Advantageously, the present disclosure describes a system that can also use POC acceleration indicators. POC acceleration indicators are able to determine POCs that involve larger number of card transactions. POC acceleration indicators help identify when the number of fraudulent cards per time interval used at the location increases over time.

Beneficially, the present disclosure describes a system that can determine a specific time window when the compromise event took place. The system can use at least one of a mass count list or a mass count plot to detect a time window when the compromise event took place. By detecting the time window, the system can detect potential compromised cards, which had transactions at the point of compromise and in the same time window. Therefore, the cards that had transactions at the point of compromise but outside of the compromise time window can be treated as normal, not a victim of the compromise event.

Advantageously, the present disclosure describes a system that can determine a reissue score for the compromised cards based on the severity level of the compromise event and the transaction characteristics of the cards. The proposed reissue score helps the card issuer make decisions of whether a compromised card needs to be reissued in the coming monitoring windows.

Beneficially, the present disclosure describes a system that can be implemented using memory arrays such as static random access memory (SRAM) arrays. In order to provide real-time detection of compromised cards, the system needs to be supported with low-latency technology. To prevent the storage element from being the bottleneck of the system, the two- and/or three-dimensional matrices that store information regarding suspicious fraud activity at various locations and/or time intervals can be implemented using SRAM arrays. Moreover, data can be tiered between faster storage technology and slower storage technology to balance the need for real-time analysis and big data storage capacity.

The present disclosure describes the technical challenges and the technical solutions associated with point-of-compromise detection systems. The embodiments described herein enable a scalable solution that detects points-of-compromise locations using time intervals and changes in frequency of detected suspicious activity. The embodiments result in a system that is much faster in identifying points-of-compromise locations than prior systems. The system can be updated and tuned to specific volumes of transactions at a location. The system can also be linked to particular merchants to identify points-of-compromise locations linked to a common merchant.

FIG. 1 illustrates a point-of-compromise detection system 100 that includes transaction cards 101, 102, 103; points-of-sale devices 111, 112, 113; network 120, and a point-of-compromise detection server 130. Each point-of-sale device 111, 112, 113 and the point-of-compromise detection server 130 may be coupled to network 120 through a network interface. Each of elements 111, 112, 113, 120, and 130 may be implemented or associated with hardware components, software components, or firmware components or any combination of such components. The point-of-compromise detection server 130 includes a memory or database 140 to store information received regarding the point-of-sale devices. The database 140 stores matrices 150 including matrix 151, matrix 152, matrix 153, etc. that contain data regarding transaction cards 101, 102, and 103 and points-of-sale devices 111, 112, and 113 as discussed in more detail below.

The point-of-compromise detection system 100 enables the detection of compromised transaction cards and/or compromised point-of-sale device locations using programmed instructions stored at the point-of-compromise detection server 130 that cause the point-of-compromise detection server 130 to analyze data received from the points-of-sale devices 111, 112, and 113 at multiple time intervals. Each matrix 151, 152, and 153 stores data regarding transaction cards and point-of-sale device locations over a different time interval. The point-of-compromise detection server 130 processes the matrices to identify points-of compromise in the point-of-compromise detection system 100, as described in more detail below.

Figure 2:
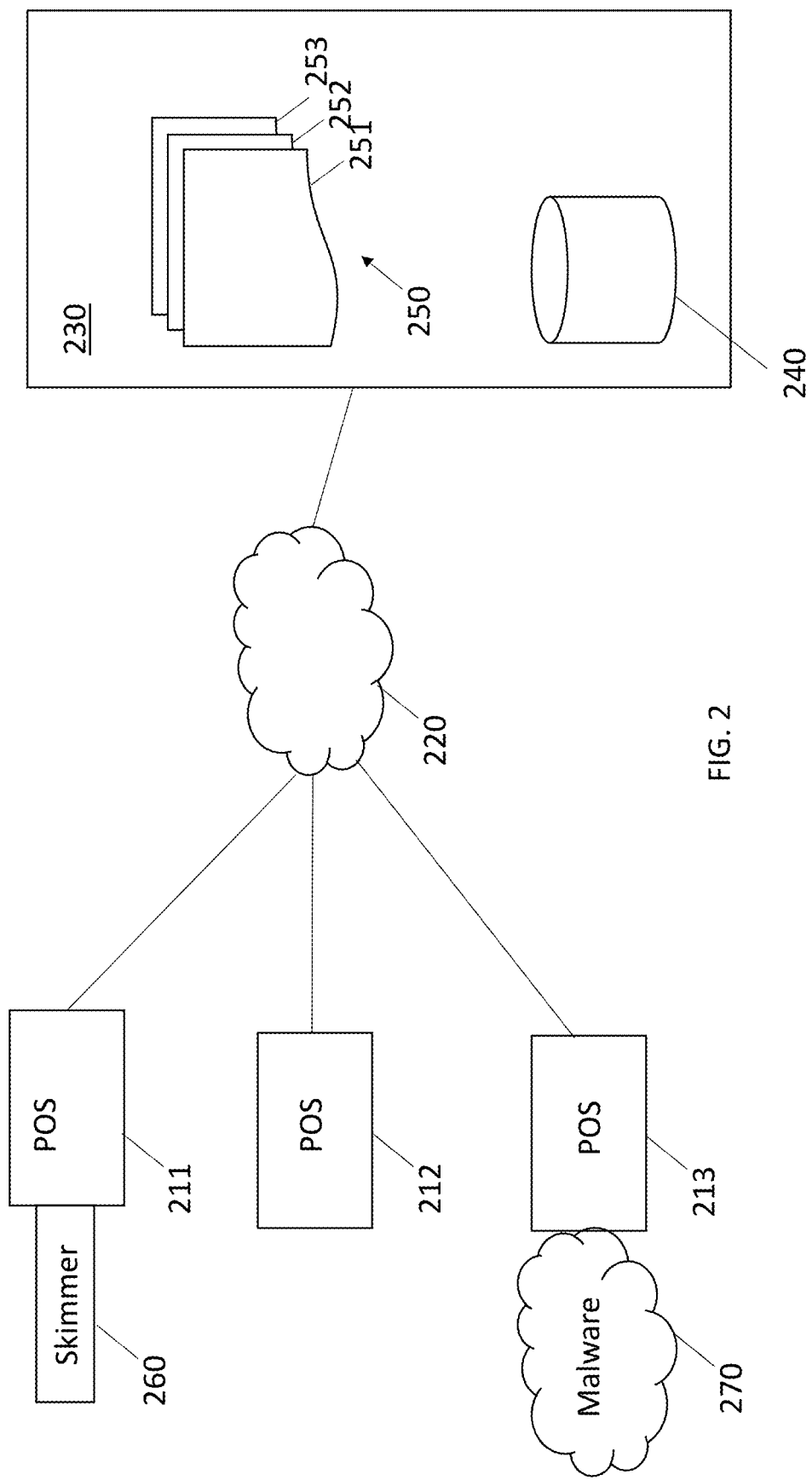
FIG. 2 is an example block diagram of a networked transaction system with some points of sale being compromised, in accordance with some embodiments of the present disclosure.

FIG. 2 illustrates a point-of-compromise detection system 200 that includes points-of-sale devices 211, 212, and 213; network 220, and a point-of-compromise detection server 230. The point-of-compromise detection server 230 includes a memory or database 240 to store information received regarding the point-of-sale devices in matrices 250 including matrix 251, matrix 252, matrix 253, etc. The point-of-compromise detection server 230 processes data received from the points-of-sale devices 211, 212, and 213 and determines possible points-of compromise at point-of-sale (POS) device 211 and POS device 213. The point-of compromise at POS device 211 can be a skimmer device 260 that reads the magnetic strip information of transaction cards presented at the POS device 211 and transmits the information to a bad actor. The point-of-compromise at POS device 213 can be malware software 270 installed on the POS device 213 that captures account information from a transaction card and transmits the information to a bad actor. Other types of devices and software besides skimmer devices and malware may be used at points-of-sale devices to compromise transaction information.

Figure 3:
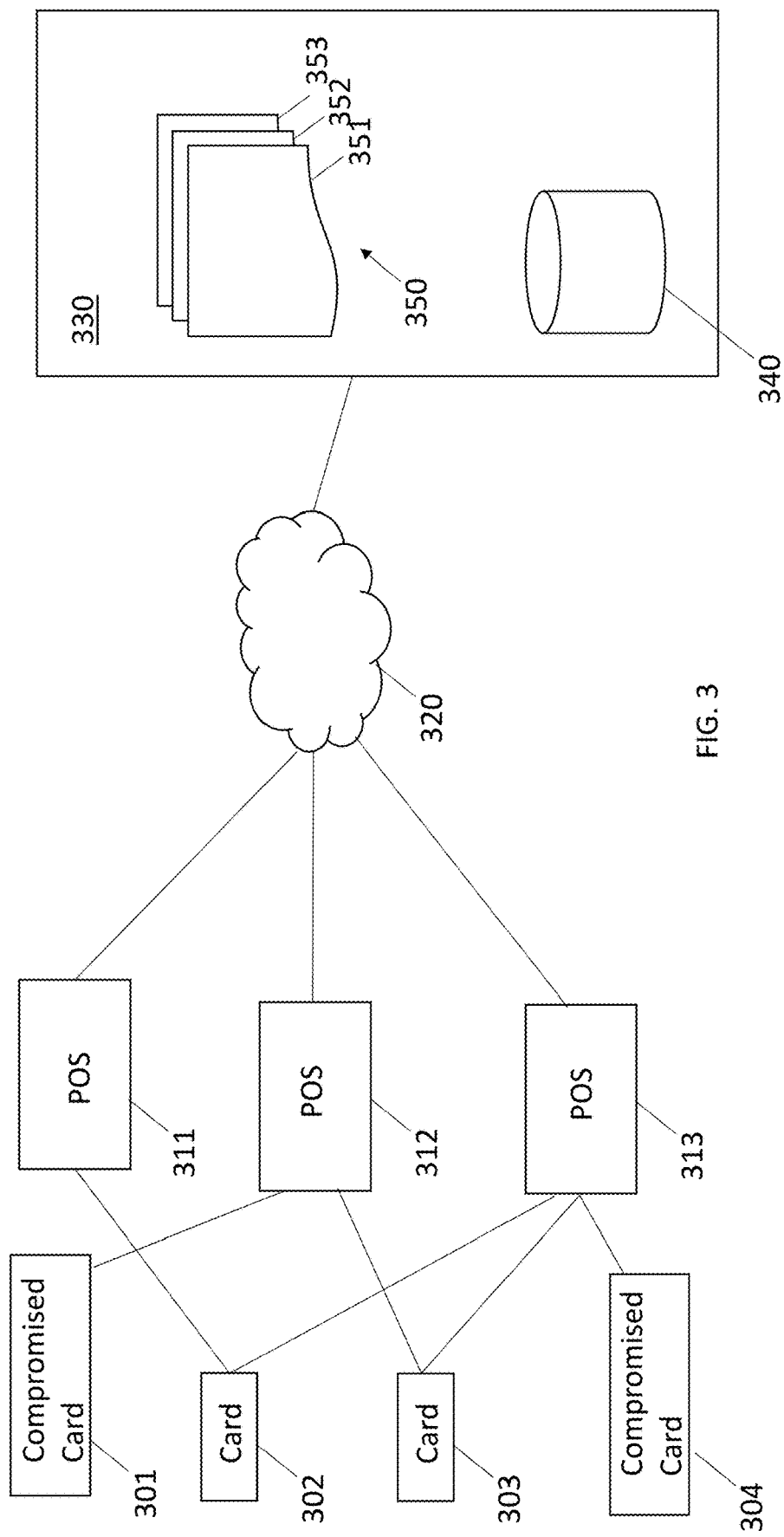
FIG. 3 is an example block diagram of a point-of-compromise detection system, in accordance with some embodiments of the present disclosure.

FIG. 3 illustrates a point-of-compromise detection system 300 that includes transaction cards 301, 302, 303, and 304; points-of-sale devices 311, 312, and 313; network 320, and a point-of-compromise detection server 330. The point-of-compromise detection server 330 includes a memory or database 340 to store information received regarding the point-of-sale devices. In an example embodiment, the database 340 stores matrices 350 including matrix 351, matrix 352, matrix 353, etc. that contain data regarding transaction cards 301, 302, 303, and 304 and points-of-sale devices 311, 312, and 313. The point-of-compromise detection server 330 processes data received from the points-of-sale devices 311, 312, and 313 and determines possible points-of compromise at point-of-sale (POS) device 311 and POS device 313. The information processed by the point-of-compromise detection server 330 determines that cards 301 and 304 are compromised and the point-of-compromise detection server 330 can send alerts to card issuers regarding the determination of compromise for each card. The issuer can terminate authorization and/or take additional steps to remedy the compromised cards.

Figure 4:
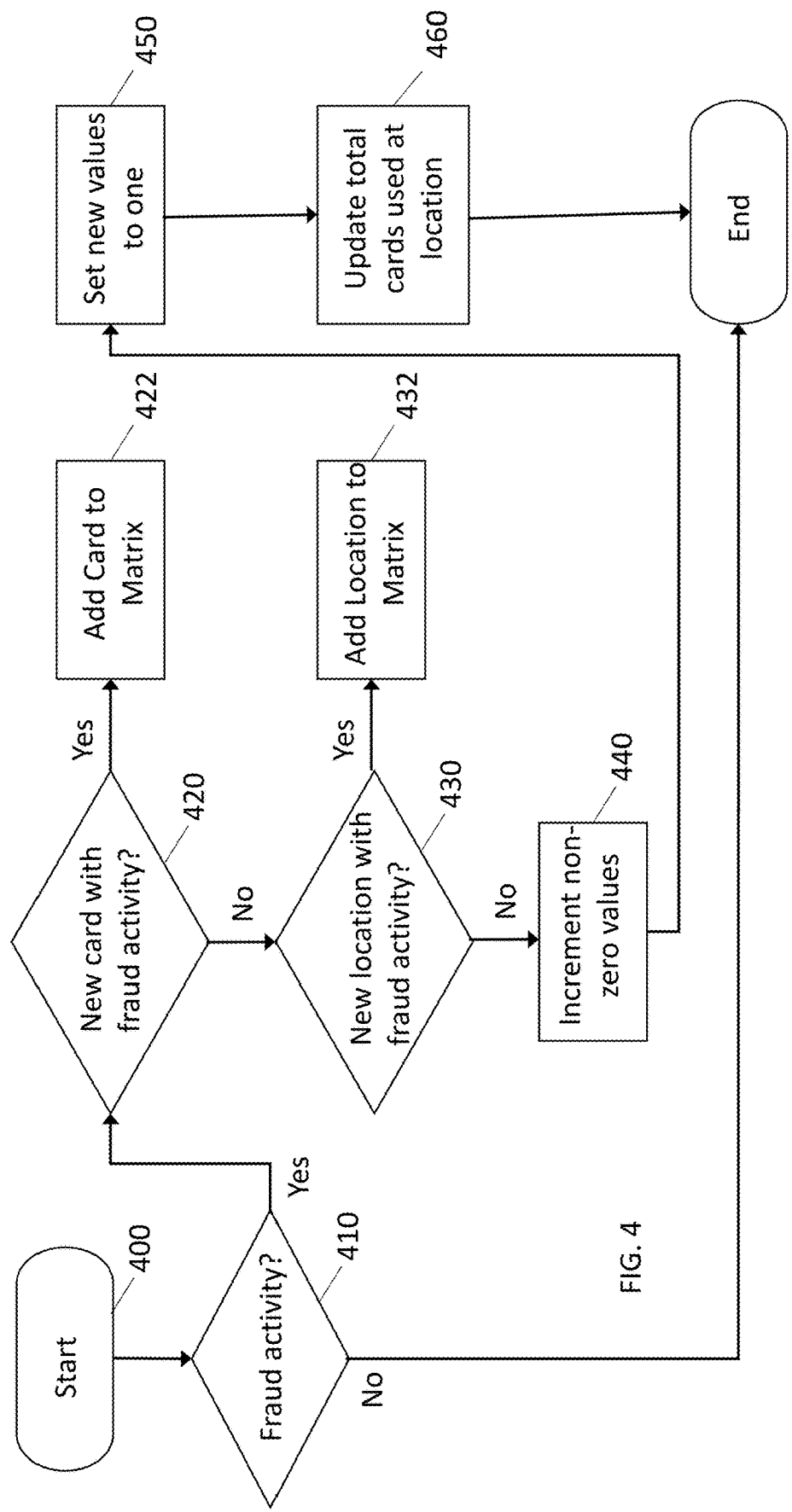
FIG. 4 is an example flow diagram outlining a process for point-of-compromise detection in accordance with some embodiments of the present disclosure.

FIG. 4 illustrates an exemplary flowchart outlining the generation of a new two dimensional matrix for locations and cards for a particular time interval in accordance with some embodiments of the present disclosure. Additional, fewer, or different operations may be performed in the method depending on the implementation and arrangement. The method 400 conducted by a data processing system (e.g. point-of-compromise detection server 130, shown and described with reference to FIG. 1) includes determining if there are new fraudulent activities during the time interval (410), identifying whether new cards have fraudulent or suspicious activity (420), adding new cards/rows to a card-location matrix (422), assessing if new locations have fraudulent or suspicious activity (430), adding new locations/columns to the card-location matrix (432), incrementing non-zero values for cards that had new fraudulent activity (440), setting all new location/card fraud pairs to 1 (450), and updating total cards transactions at location (460).

The point-of-compromise detection system generates a new two dimensional matrix for a time interval which is copy of a two dimensional matrix for the previous time interval. The copy serves as the basis for the two dimensional matrix generated for the time interval that just transpired and is updated with collected data for the time interval that just transpired.

At operation 410, the point-of-compromise detection system determines if there have been any new fraudulent or suspicious activity. If the point-of-compromise detection system determines that there were no new fraudulent transactions, then only the total card transactions need to be updated at locations which have had previous fraudulent or suspicious activity. If the point-of-compromise detection system determines that there has been new fraudulent or suspicious activity, then the system determines where these new fraudulent or suspicious activity occurred in order to generate the new two dimensional matrix for the time interval that just transpired.

At operation 420, the point-of-compromise detection system determines if there have been new cards involved with new fraudulent or suspicious activity. If the point-of-compromise detection system determines that new cards were involved with new fraudulent or suspicious behavior, the point-of-compromise system, at operation 422, adds these new cards as rows to the matrix. Otherwise, no new cards or rows will be added to the matrix.

At operation 430, the point-of-compromise detection system determines if there have been new locations involved with new fraudulent or suspicious activity. If the point-of-compromise detection system determines that new locations were involved with new fraudulent or suspicious behavior, the point-of-compromise detection system, at operation 432, adds these new locations as columns to the matrix. Otherwise, no new locations or columns will be added to the matrix.

At operation 440, the point-of-compromise detection system increments non-zero values for cards that had new fraudulent or suspicious activity during the time interval that just transpired. This increment affects all of the POC indicators and POC acceleration indicators relating to all locations for that particular card. This change represents that the card is still engaging in fraudulent and suspicious activity and may have been compromised at one of the previous locations.

At operation 450, the point-of-compromise detection system sets all new location/card pairs to 1. These values are used to determine the POC indicators and POC acceleration indicators relating to all new locations for that particular card.

At operation 460, the point-of-compromise detection system updates the total cards used at location to be the total of the previous time interval's matrix added to the total new cards that have engaged in transactions at each location.

The method depicted in FIG. 4 can also be used to update an existing two dimensional matrix for locations and cards for a particular time interval, in accordance with some embodiments of the present disclosure. The operations for updating an existing two dimensional matrix are similar to generating a new two-dimensional matrix as described previously. The only difference is that the updated matrix for the time interval that just transpired will replace the previous matrix. In such circumstances, the point-of-compromise detection server stores previous POC indicators and POC acceleration indicators for each location. Similarly, the point-of-compromise detection server may store previous card fraud indicators and card fraud acceleration indicators.

FIG. 5A depicts a matrix used by an example point-of-compromise detection system. FIGS. 5B-5F represent how different types of collected data can affect the matrix. The collected data may cause any combination of modifications exemplified in FIGS. 5B-5F or others. The matrix of FIG. 5A includes rows of transaction cards and columns of locations. In the matrix, the fraud cards are denoted as $C\_1$, $C\_2$, $C\_3$, ... $C\_i$. For each card $C\_i$, the system collects all the locations where the $C\_i$ had known or suspicious fraud transactions in a time window and locations in the same time window where the $C\_i$ had non-fraud transactions and transaction times before the latest known or suspicious fraud transaction. The locations can be a physical location like a gas station or restaurant, or a branch of the chain stores in the same ZIP code or area, or a brand, or even a website. The system denotes a collection of all distinct locations from all the above fraud cards as $L\_1$, $L\_2$, $L\_3$, ... $L\_j$. The transaction locations could be hierarchal. For example, a gas station and its branch or brand could be listed and treated equally as transaction locations in the algorithm. In an exemplary embodiment, the system starts with the assumed state that there are no known points-of-compromise or compromised cards have been reissued or replaced. Reissued or replaced cards are not included in the monitoring and analysis system, unless they have new fraud transactions.

The system constructs a matrix M with all $L\_j$ as the columns and all $C\_i$ as the rows. The matrix cell $m\_{ij}$ takes value of 1 if $C\_i$ had transactions in the past 6 months at $L\_j$, otherwise 0. Due to the size of all $L\_j$ together, the matrix M would be sparse with many of the cells having value of 0. There is additional row at the matrix bottom, which is the total number of distinct cards that had transactions at each $L\_j$ at the same time window.

After a time interval such as a day or a week, the system updates the matrix M. Updates to the matrix are adjustable, including a few hours, a few days, a few weeks, or even a few months. Once the time interval length is set, the system performs consecutive monitoring and analysis on the matrix M at each interval. The following description provides five sample update scenarios (shown in FIGS. 5B-5F). In practice, the update could be any mixtures of these five scenarios.

FIG. 5B depicts a modified matrix as compared to the matrix of FIG. 5A after a new time interval has passed, where no known or suspicious transactions occurred. In this case, the last row, which represents the total number of cards used at each location, is the only part of the matrix that is updated by the point-of-compromise detection system.

In the modified matrix of FIG. 5B, all the zeros and ones remain the same, and even the last row remains the same, meaning no known or suspicious fraud transactions occurred during the current interval and no new card had transactions at any of the locations. Or all the zeros and ones remain the same, but some cells of the last row get updates, meaning no known or suspicious fraud transactions occurred, but there were some new cards that had transactions at some of the locations. In the modified matrix of FIG. 5B, the $2^{nd}$ and $4^{th}$ cells of the last row are updated as some new cards had non-fraud transactions at these locations.

FIG. 5C shows a modified matrix as compared to the matrix of FIG. 5A after a new time interval has passed, where new fraudulent or suspicious transactions have occurred at locations already contained within the matrix and at specific locations where cards have had previous fraudulent transactions. This means that this specific location/card pair has had previous fraudulent or suspicious transactions. In this case, the point-of-compromise detection system increments, by one, the non-zeros representing previous fraudulent or suspicious transactions at any location for this card.

In the matrix of FIG. 5C, some cards had new fraud transactions at the locations where they had transactions before. At the row where the card is, the system updates all the one's to two's, while all zeros remain the same. Note a card might have multiple fraud transactions at different locations where the card had transactions before during the same interval and the system updates the one's to two's, not to three or more for the current interval. As such, the system provides weights to frequent fraud cards, and in the meantime, avoid giving over weights. Below is an illustration example where card $C\_5$ had new fraud transaction at location $L\_1$. Note that the value at the cell $L\_5$ is updated to 2 as well. The last row of the matrix M remains the same because the existing cards had transactions at the existing locations.

FIG. 5D illustrates a modified matrix as compared to the matrix of FIG. 5A after a new time interval has passed, where new fraudulent or suspicious transactions have occurred at locations already contained within the matrix and at specific locations where cards have not had previous fraudulent transactions. This means that these locations have had other fraudulent or suspicious transactions with other cards, but has not had fraudulent or suspicious transactions with this particular card. In this case, the point-of-compromise detection system updates the zeroes to ones where the new fraud transactions occurred. The point-of-compromise detection system also increments, by one, the non-zeros representing previous fraudulent or suspicious transactions at other locations.

In the matrix of FIG. 5D, some cards had new fraud transactions at the locations but they did not have transactions before and the locations already exist in the matrix M. The system updates the zero's to one's where the fraud transactions occurred, and updates the one's at the same row to two's. All the other zero's at the same row remain the same. Below is an illustration example where value of the cell $m\_1,1$ is changed from 0 to 1 as card $C\_1$ had new fraud transaction(s) at location $L\_1$. Note that all the ones at the same row are updated to two's.

FIG. 5E depicts a modified matrix as compared to the matrix of FIG. 5A after a new time interval has passed, where new fraudulent or suspicious transactions have occurred at locations not already contained within the matrix. This means that these locations have not had other fraudulent or suspicious transactions with other cards. In this case, the point-of-compromise detection system begins by adding new columns to the matrix representing these new locations. The point-of-compromise detection system also updates the zeroes to ones where the new fraud transactions occurred.

In the modified matrix of FIG. 5E, some cards had new fraud transactions at the locations which did not exist in the matrix M before. The system expands the matrix M by adding one more location column. All cards that had transactions at the new location from the beginning time window up to the time right before the new fraud transaction occurred, have value of 1, otherwise 0. Below is an illustration example where card $C\_2$ had new fraud transaction at location $L\_9$ in the current interval. Note that the cell $m\_6,9$ also has value of 1 as card $C\_6$ had transactions at $L\_9$ that occurred before the new fraud transaction. At the bottom, the new column $L\_9$ has its corresponding total number of transactions up to the time right before the new fraud transaction occurred.

FIG. 5F illustrates a modified matrix as compared to the matrix of FIG. 5A after a new time interval has passed, where new fraudulent or suspicious transactions have occurred using new cards that have not previously been involved with fraudulent or suspicious transactions. This means that these new cards are having fraudulent transactions at locations which have had previous fraudulent transactions with other cards. In this case, the point-of-compromise detection system adds new rows to the matrix representing these new cards and sets fraudulent location/card pairs to one.

In the modified matrix of FIG. 5F, there are new cards that had fraud transactions at some locations in the matrix M. The system expands the matrix M by adding one more row for each of the new cards. Below is an illustration example where a new card $C\_7$ had fraud transaction(s) at location $L\_3$. Note that the cells $m\_7,4$ and $m\_7,8$ have value of one as card $C\_7$ had transactions at these locations up to the time right before the new fraud transaction occurred and that the corresponding cells in the last row are updated as well.

The five scenarios described with reference to FIG. 5B-5F or a mixture of the scenarios are possible updates for the matrix M in interval 1. The matrix can be horizontally and/or vertically expandable. In the meantime, the matrix can be horizontally and/or vertically shrinkable as well.

At time interval 2, the system updates matrix M. If the same card had fraud transactions in interval 2, the system incrementally updates the values. So, if the value is 1, now it becomes 2, and if it's 2, now it becomes 3, and so on. At the end of each interval, the system continues doing similar incremental updates. In this way, the system continues cumulatively monitoring the card fraud occurrence and interactions with the locations.

At each interval, after updating the matrix M, the system computes various values with the matrix. First, the system sums all rows (except the last row in cases where the last row represents the total number of cards used at each location) for each column, then takes the ratio of the sum over the total number of cards at the same location, whose value is stored in the last row of the same matrix M. This ratio is a POC (points-of-compromise) indicator. Second, the system sums all columns for each row (except the last row in cases where the last row represents the total number of cards used at each location) to find a card fraud indicator (CFI) value. The system performs the two calculations starting at the initial time window when all the cells of the matrix M only contain zeros or ones. For convenience, the initial time window is interval 0. Starting at interval 1, besides calculating POC indicator and card fraud indicator, the system does two more calculations, including the ratio of (interval 1 POC indicator−interval 0 POC indicator)/interval 0 POC indicator. This ratio is the POC acceleration indicator (PAI). Alternatively, the PAI can be defined as the ratio of (most recent interval POC indicator−second most recent interval POC indicator)/initial interval POC indicator. The system also determines the ratio of (interval 1 card fraud indicator−interval 0 card fraud indicator)/interval 0 card fraud indicator (or the ratio in accordance with the alternate definition) to find a card fraud acceleration indicator. These computations continue for interval 2, interval 3, and so on.

At each interval, the system assesses the three measures: POC indicator, POC acceleration indicator, and card fraud acceleration indicator. The POC indicator works well when the total number of cards at the locations, which is stored in the last row of the matrix M, is relatively small. For instance, if a small coffee shop had 30 cards that had transactions in the past interval, and if, after one or more than one intervals, 10 of them had fraud in various locations, its POC indicator would be ⅓. The population of the cards used in the coffee shop was small, and the POC indicator was relatively high. Thus, this measure makes the coffee shop stand out as a potential POC, which needs follow-up investigations. The matrix M is configured such that whenever a card has a fraud transaction at a location, all other locations where the same card had transactions in the past, get updated. If a card is compromised at a location, it is likely to be used somewhere else. With the matrix M, the system keeps tracks of the past locations of a card which had a new fraud transaction. If the updates of multiple cards connect to a common location, its POC indicator and/or POC acceleration indicator would be high which makes it stand out as a potential POC. In at least one embodiment, the system receives data confirming or not confirming the potential POC as a compromised location.

Another feature of the matrix M is that the system keeps the cumulative information of all card transactions up to current time interval. Even if the system makes discrete interval observations, each time, the system observes all the information up to current. A compromise window usually is a short time of period like just a few days. In an example embodiment, the system has a cumulative card transaction history, so that the system can avoid breaking up a possible compromise window and not detecting a POC. The system can adjust the observation intervals if needed to promptly catch any short compromise windows. If a card has new fraud transactions, the system incrementally updates the related cells in the matrix M. This way, the system gives proper weights to the frequent fraud cards in the three measures. If a card has frequent fraud transactions over observation intervals, the card fraud acceleration indicator would have high values over consecutive observation intervals, which can help determine if there is a need to reissue or replace this card.

The POC acceleration indicator works well when the total number of cards at the locations is relatively large. A Walmart location, for example, might have 1000 cards that were used in store recently. If 5 cards had subsequent fraud transactions in the first observation interval, 15 cards in the second observation interval, and 45 cards in the third observation interval, the three POC indicator values would not be high, but the two consecutive POC acceleration indicators would be high. The high POC acceleration indicators show a possible POC at this Walmart location. In at least one embodiment, the system uses the three measures together to make optimal business decisions.

After the system determines a location had cards that were compromised, the system sends instructions to reissue or replace these compromised cards even if they did not have any fraud transactions, which are usually the majority part of the total cards in the last row of the matrix M. For the fraud cards in the matrix M, if they have been reissued or replaced, they are removed from the matrix M. After fraud cards (rows) from the matrix are removed from the matrix, some columns (locations) might only have value of zeros as the matrix M is sparse and such columns can be removed as well. Therefore, the matrix M could be horizontally and/or vertically shrinkable. On the other hand, if any cards in the matrix whose latest fraud transactions occurred already 6 months ago (beyond the length of the initial time window), and these cards did not belong to any POC events yet, the system removes these old fraud cards, thereby shrinking the dimension of the matrix M. Such sizing of the matrix can be done at every observation interval to make the matrix M ready for expansion at the next observation interval.

Figure 6B:
Figure 6C:

Referring now to FIGS. 6A-6C, there are three matrices 610, 620, and 630 which represent three adjacent time intervals. The matrices 610, 620, and 630 show the card fraud indicator, the card fraud acceleration indicator, the POC indicator, and the POC acceleration indicator. The card fraud indicator is generated by summing all values for a specific card (sum all the numbers in a row). For example, in matrix 610, the card fraud indicator for card 1 (C1) is 3, for C2 is 2, for C3 is 3, for C4 is 4, etc.

The card fraud acceleration indicator is generated by calculating the ratio of (interval 1 card fraud indicator–interval 0 card fraud indicator)/interval 0 card fraud indicator. For ease of reading, values that change between intervals are shown in boldface, italics, and underlining. The card fraud acceleration indicator in matrix 620 reflects changes to values from matrix 610 to matrix 620, or from interval 0 to interval 1. By way of example, C1 changes from matrix 1 to matrix 2 by increasing L3 from 0 to 1, increasing L4 from 1 to 2, and increasing L6 from 1 to 2. The card fraud indicator, thus, increases from 3 in matrix 610 to 6 in matrix 620. The card fraud accelerator indicator for C1 in matrix 620 is (6 (new fraud indicator)–3 (old fraud indicator))/3 (old fraud indicator) or 1.

Looking at matrix 630, because the indicators for C1, C2 and C3 do not change from matrix 620 to matrix 630, the card fraud acceleration indicator becomes zero (0) again.

The POC indicator is generated by summing all values for a specific location except the 'total cards used at location' row (sum all the numbers in a column except the 'total cards used at location' row). For example, in matrix 610, the POC indicator for location 1 (L1) is 2, for L2 is 2, for L3 is 3, for L4 is 3, etc. The POC acceleration indicator is generated by calculating the ratio of (interval 1 POC indicator–interval 0 POC indicator)/interval 0 POC indicator. So, for example, looking at matrix 610 (interval 0) and matrix 620 (interval 1), the POC indicator for location 3 has increased from 3 to 5 because the fraud numbers at location 3 have increased for C1, C3 and C6. The resulting POC acceleration indicator is, thus, (5(new POC indicator)–3 (old POC indicator))/3 (old POC indicator) or 0.667.

Matrix 610 is also provided below.

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 0 | 1 | 0 | 1 | 1 | 0 | 3 | 0 |
| C2 | 1 | 0 | 1 | 0 | 0 | 0 | 0 | 0 | 2 | 0 |
| C3 | 0 | 1 | 0 | 1 | 1 | 0 | 0 | 0 | 3 | 0 |
| C4 | 0 | 0 | 0 | 0 | 0 | 1 | 1 | 1 | 3 | 0 |
| C5 | 1 | 0 | 0 | 0 | 1 | 0 | 0 | 0 | 2 | 0 |
| C6 | 0 | 1 | 1 | 0 | 0 | 1 | 1 | 1 | 5 | 0 |
| C7 | 0 | 0 | 1 | 1 | 0 | 0 | 0 | 1 | 3 | 0 |
| POC Indicator | 0.095 | 0.044 | 0.088 | 0.333 | 0.077 | 0.075 | 0.064 | 0.057 | n/a | n/a |
| POC Acceleration | 0 | 0 | 0 | 0 | 0 | 0 | 0 | 0 | n/a | n/a |
| Total Cards | 21 | 45 | 34 | 9 | 26 | 40 | 47 | 53 | n/a | n/a |

Matrix 620 is also provided below.

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | *1* | *2* | 0 | *2* | 2 | 0 | 7 | *1.33* |
| C2 | 1 | 0 | 1 | 0 | 0 | 0 | 0 | 0 | 2 | 0 |
| C3 | 0 | *2* | *1* | *2* | 2 | 0 | *0* | 0 | 7 | *1.33* |
| C4 | 0 | 0 | 0 | 0 | 0 | 1 | 1 | 1 | 3 | 0 |

-continued

|    | L1    | L2    | L3    | L4    | L5    | L6    | L7    | L8    | Card Fraud Indicator | Card Fraud Acceleration |
|----|-------|-------|-------|-------|-------|-------|-------|-------|----------------------|-------------------------|
| C5 | 1     | 0     | 0     | 0     | 1     | 0     | 0     | 0     | 2                    | 0                       |
| C6 | 0     | *2*   | *2*   | 0     | 0     | *2*   | *2*   | *2*   | *10*                 | *1*                     |
| C7 | 0     | 0     | 1     | 1     | 0     | 0     | 0     | 1     | 3                    | 0                       |
| POC Indicator | 0.095 | *0.089* | *0.176* | *0.556* | 0.115 | 0.125 | 0.106 | 0.075 | n/a | n/a |
| POC Acceleration | 0 | *1* | *1* | *0.670* | 0.494 | *0.667* | *0.334* | *0.5* | n/a | n/a |
| Total Cards | 21 | 45 | 34 | 9 | 26 | 40 | 47 | 53 | n/a | n/a |

Matrix 630 is also provided below.

|    | L1    | L2    | L3    | L4    | L5    | L6    | L7    | L8    | Card Fraud Indicator | Card Fraud Acceleration |
|----|-------|-------|-------|-------|-------|-------|-------|-------|----------------------|-------------------------|
| C1 | 0     | 0     | 1     | 2     | 0     | 2     | 2     | 0     | 7                    | *0*                     |
| C2 | 1     | 0     | 1     | 0     | 0     | 0     | 0     | 0     | 2                    | 0                       |
| C3 | 0     | 2     | 1     | 2     | 2     | 0     | 0     | 0     | 7                    | *0*                     |
| C4 | 0     | 0     | 0     | 0     | 0     | *2*   | *2*   | *2*   | *6*                  | *1*                     |
| C5 | 1     | 0     | 0     | 0     | 1     | 0     | 0     | 0     | 2                    | 0                       |
| C6 | 0     | 2     | 2     | 0     | 0     | 2     | 2     | 2     | 10                   | 0                       |
| C7 | 0     | 0     | 1     | 1     | 0     | 0     | 0     | 1     | 3                    | 0                       |
| POC Indicator | 0.095 | 0.089 | 0.176 | 0.556 | 0.115 | *0.150* | *0.128* | *0.094* | n/a | n/a |
| POC Acceleration | 0 | *0* | *0* | *0* | 0 | *0.2* | *0.208* | *0.253* | n/a | n/a |
| Total Cards | 21 | 45 | 34 | 9 | 26 | 40 | 47 | 53 | n/a | n/a |

Each of the matrices 251-253 of FIG. 2, 351-353 of FIG. 3, the matrices of FIGS. 5A-5F and 610-630 of FIGS. 6A-6C can be implemented as a memory array, such as a static random access memory (SRAM) array, which is described in further detail below.

During the consecutive monitoring, when the system calculates the card fraud indicator (CFI), the point of compromise indicator (POC), and the POC acceleration indicator (PAI), the system builds (e.g., generates, creates) a CFI trend table and a POC & PAI trend table. FIG. 7A depicts an example CFI trend table 710. The CFI trend table 710 of FIG. 7A is from interval 0 to interval 7. The CFI trend table 710 of FIG. 7A includes rows of transaction cards and columns of intervals. In the example CFI trend table 710, the CFI values at interval 0 were 1, as the system selected credit cards that had at least one fraud transactions in the initial interval, or null, as some cards did not have any fraud transaction yet. At interval 1, cards C1 and C4 had new fraud transactions, so their CFI values increased to 2. The other cards still had CFI value of 1 or null, as they did not have new fraud transactions in this interval. At interval 7, cards C1 and C3 had high CFI values compared to the other cards. This could help the card issuer make a prompt decision to reissue or replace these two cards.

The CFI trend table 710 is also provided below.

|    | CFI0 | CFI1 | CFI2 | CFI3 | CFI4 | CFI5 | CFI6 | CFI7 |
|----|------|------|------|------|------|------|------|------|
| C1 | 1    | 2    | 3    | 4    | 4    | 5    | 6    | 7    |
| C2 | 1    | 1    | 2    | 2    | 2    | 2    | 3    | 3    |
| C3 | 1    | 1    | 1    | 2    | 2    | 3    | 4    | 5    |
| C4 | 1    | 2    | 2    | 2    | 2    | 2    | 2    | 3    |
| C5 | 1    | 1    | 1    | 1    | 1    | 1    | 1    | 1    |
| C6 | null | null | 1    | 1    | 2    | 2    | 2    | 2    |

FIG. 7B depicts an example POC & PAI trend table 720. The POC & PAI trend table 720 of FIG. 7B is from interval 0 to interval 3. The POC & PAI trend table 720 of FIG. 7B includes rows of transaction cards and columns of metrics (POC and PAI) at various intervals. As the intervals progress, the POC/PAI values of merchant L1 continued increasing much faster than the other merchants. It was likely that the merchant was a potential point of compromise, and the card issuer should take further investigation on this merchant.

The POC & PAI trend table 720 is also provided below.

|    | Total Cards | POC0 | PAI0 | POC1 | PAI1 | POC2 | PAI2 | POC3 | PAI3 |
|----|-------------|------|------|------|------|------|------|------|------|
| L1 | 4459        | 0.00292 | 0 | 0.00336 | 0.1507 | 0.00538 | 0.6919 | 0.00695 | 0.5377 |
| L2 | 24838       | 0.00004 | 0 | 0.00004 | 0 | 0.00004 | 0 | 0.00008 | 1 |
| L3 | 1565        | 0.00317 | 0 | 0.00317 | 0 | 0.00317 | 0 | 0.00317 | 0 |
| L4 | 3601        | 0.00028 | 0 | 0.00028 | 0 | 0.00056 | 1 | 0.00083 | 1.9643 |
| L5 | 17532       | 0.00006 | 0 | 0.00006 | 0 | 0.00006 | 0 | 0.00006 | 0 |
| L6 | 39855       | 0.00003 | 0 | 0.00003 | 0 | 0.00008 | 1.6667 | 0.0001 | 0.6667 |

In some embodiments, a cut-off (e.g., threshold) is selected for the POC and the PAI, and any locations with a POC or PAI are identified as (potential) points of compromise. However, when there are many merchants included in the POC & PAI trend table, it is sometimes difficult to select a cut-off point on POC and PAI values to separate out potential points of compromise out. To address this issue, the system can filter out third-party merchants that the card issuer may be less liable for. These types of merchants may include big virtue/on-line brands or websites with a high volume of card transactions where fraud transactions were frequently observed. By removing these types of merchants, the total number of cards used at each location in the trend table may be more comparable with each other. In addition, filtering improves computation efficiency as it is time consuming to calculate the total number of cards used at each location for the merchants with a high volume of transactions.

Another strategy is to segment the merchants into different groups and compare the POC & PAI values inside each group. There may not be a hard cut-off point of the POC & PAI values across different groups. Each group may have its own cut-off point that may be determined based on business knowledge. In one example of segmentation, a compromised card is then used for fraud in nearby gas stations or restaurants. The system can segment the merchants according to geolocations. The system can also segment the merchants according to business types as different businesses might have different fraud patterns or frequencies. The system can put all gas stations into one group, all fast food chain stores into another group, and so on. Another option is that the system segments the merchants based on the range of the total number of cards used at each location, such as [0,5000], [5001,20000], [20001,100000], and [100001 and beyond]. The total number of cards used at each location are an indicator of the transaction traffic, which is highly correlated with the number of fraud transactions. The outliers of the POC/PAI values inside each group could be a point-of-compromise suspect that needs further investigations from the card issuer.

The system can determine a starting and ending date of the compromise event. All cards that had transactions at the location and in the time window can be compromised. The cards that had transactions at the location but not in the time window are treated as having normal transactions. In an example, the initial interval started on 2018-11-01, ended on 2019-04-07. We cut the interval into a-week-long slices. Below show the ending dates of the granular slices:

'2018-11-04', '2018-11-11', '2018-11-18', '2018-11-25', '2018-12-02', '2018-12-09', '2018-12-16', '2018-12-23', '2018-12-30', '2019-01-06', '2019-01-13', '2019-01-20', '2019-01-27', '2019-02-03', '2019-02-10', '2019-02-17', '2019-02-24', '2019-03-03', '2019-03-10', '2019-03-17', '2019-03-24', '2019-03-31', '2019-04-07'

The system calculates the number of distinct credit cards that had transactions at the compromised location in each slice prior to the respective card's latest fraud transaction in this interval. At the second monitoring interval ending on 2019-04-14, the system extends the granular slice list by adding the slice of 2019-04-14 to the end:

'2018-11-04', '2018-11-11', '2018-11-18', '2018-11-25', '2018-12-02', '2018-12-09', '2018-12-16', '2018-12-23', '2018-12-30', '2019-01-06', '2019-01-13', '2019-01-20', '2019-01-27', '2019-02-03', '2019-02-10', '2019-02-17', '2019-02-24', '2019-03-03', '2019-03-10', '2019-03-17', '2019-03-24', '2019-03-31', '2019-04-07', '2019-04-14'

Figure 8A:
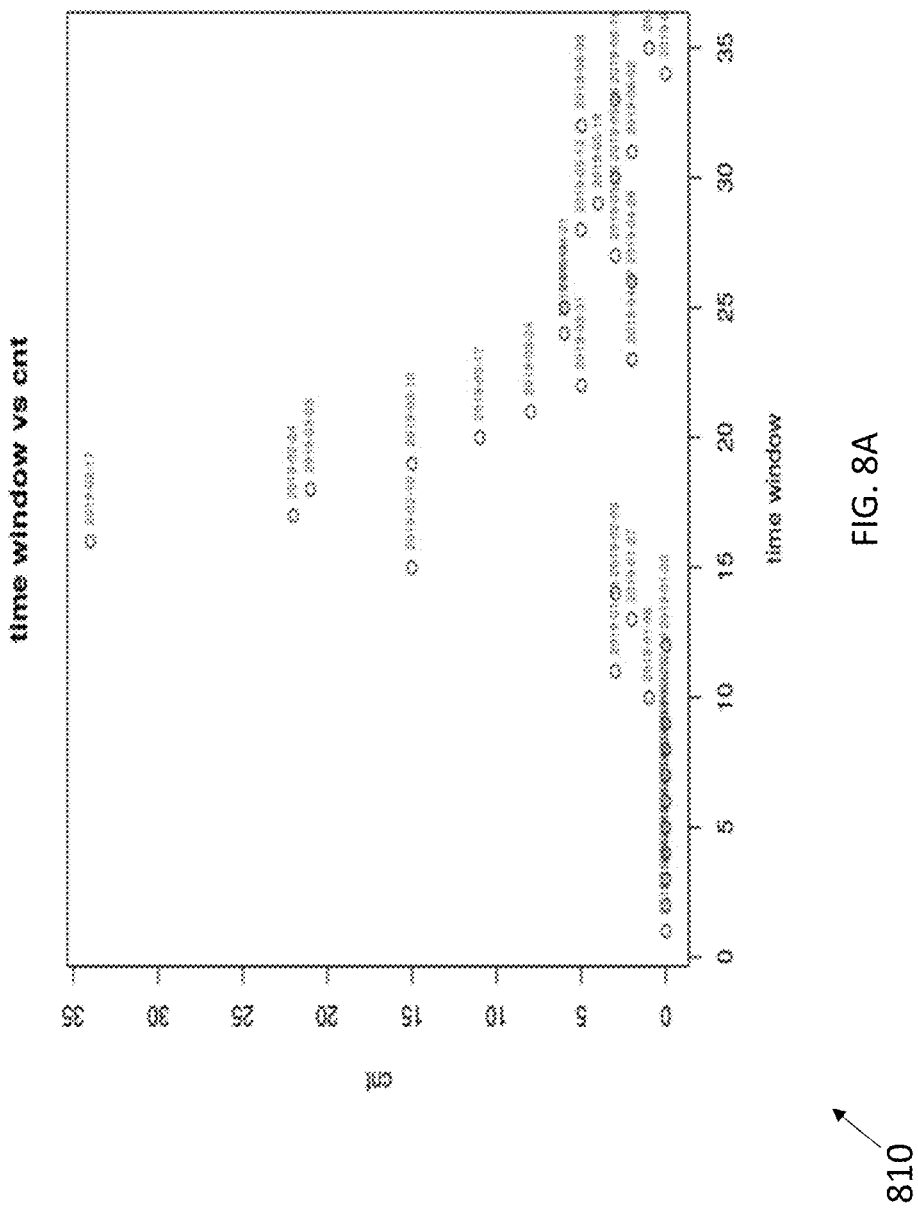
FIG. 8A depicts an example mass count plot.

The system calculates the number of distinct credit cards that had transactions at the compromised location in each slice prior to their latest fraud transaction up to the date of 2019-04-14. The same calculation is repeated at each new interval, and a plot of the granular slice list versus the number of distinct cards is generated, which can be referred to as the mass count plot. FIG. 8A depicts an example mass count plot 810. The mass count plot 810 shows the granular slices from 2018-11-04 to 2019-06-30. After a few more intervals, the mass count plot 810 shows a clear spike, and the associated date is usually close to when the compromise event gets started. When a compromise event takes place, the information of many cards is abruptly exposed to the hacker, and then used afterwards for fraud transactions. This leads to a spike in the mass count plot 810. Conversely, the system can uncover the compromise starting date with the spike. The mass count plot 810 can be arranged as a list (e.g., the mass count list). In the example, the mass count list has 35 entries.

FIG. 8B depicts an example sub-list 820. The system determines a median of the mass count list. Then the system generates the sub-list 820 by selecting points from the mass count list that have greater value than the median.

The sub-list 820 has 13 entries, where the second entry, the slice of 2019-02-17, has the highest count. The first entry is the slice of 2019-02-10 and there is no time gap between the two slices. As the first entry has high counts and does not have a time gap with the spike, the system can claim the starting date of the compromise event was in the slice of 2019-02-10. The earliest starting date could be 2019-02-04, as it was the beginning of the slice. It's challenging to determine the ending date of the compromise event, as the event might be still ongoing when the system tries to detect the compromise window. The first eight entries of the above sub-list 820 are all adjacent to each other in terms of time. From the ninth entry, there are time gaps with neighboring slices. The system's last observation is on 2019-06-30. Normally, when close to the observation date, the mass counts will be getting less and less as the time is getting tight for the compromised cards to be used for fraud. However, there are still see frequent entries that were greater than the median count of the mass count list. The last entry with the mass count greater than the median is the slice of 2019-06-09, only 3 weeks away from 2019-06-30. Normally, the mass count of the recent entries would not be high, and a legitimate reason would be that the compromise event was still active when we were making the last observation on 2019-06-30. This condition can be seen from the above mass count plot 810, where most of the counts at the lower right corner are much higher than those at the lower left corner.

It could be very useful for the card issuer that the system can use the mass count list and the mass count plot 810 to help determine an ongoing compromise event. The system and/or the card issuer can take prompt actions to stop the ongoing compromise event and save business losses. FIG. 8C depicts an example sub-list 830. The sub-list 830 is that of the mass count list of another compromise event, which originally contains 60 one-week-long slices from 2018-07-08 to 2019-08-25. The entries of the sub-list below are all greater than the median of the mass count list. The entry of 2019-05-05 has the highest count. The entry before the highest mass count is the slice of 2019-03-31. There is an apparent time gap between the two entries, which is different from the first mass count list example. In this case, the system treats the preceding slices as white noises, and claims the starting date of the compromise event is in the slice of 2019-05-05, which could be as early as 2019-04-29. In the two examples, the system consistently determines the compromise event starting date in or near the time slice with the highest mass count. The starting date could be in one of the entries before the one with the highest mass count, but there must be no time gap among the entry with the starting date, the entry with the highest mass count, and any entries in between.

Figure 8D:
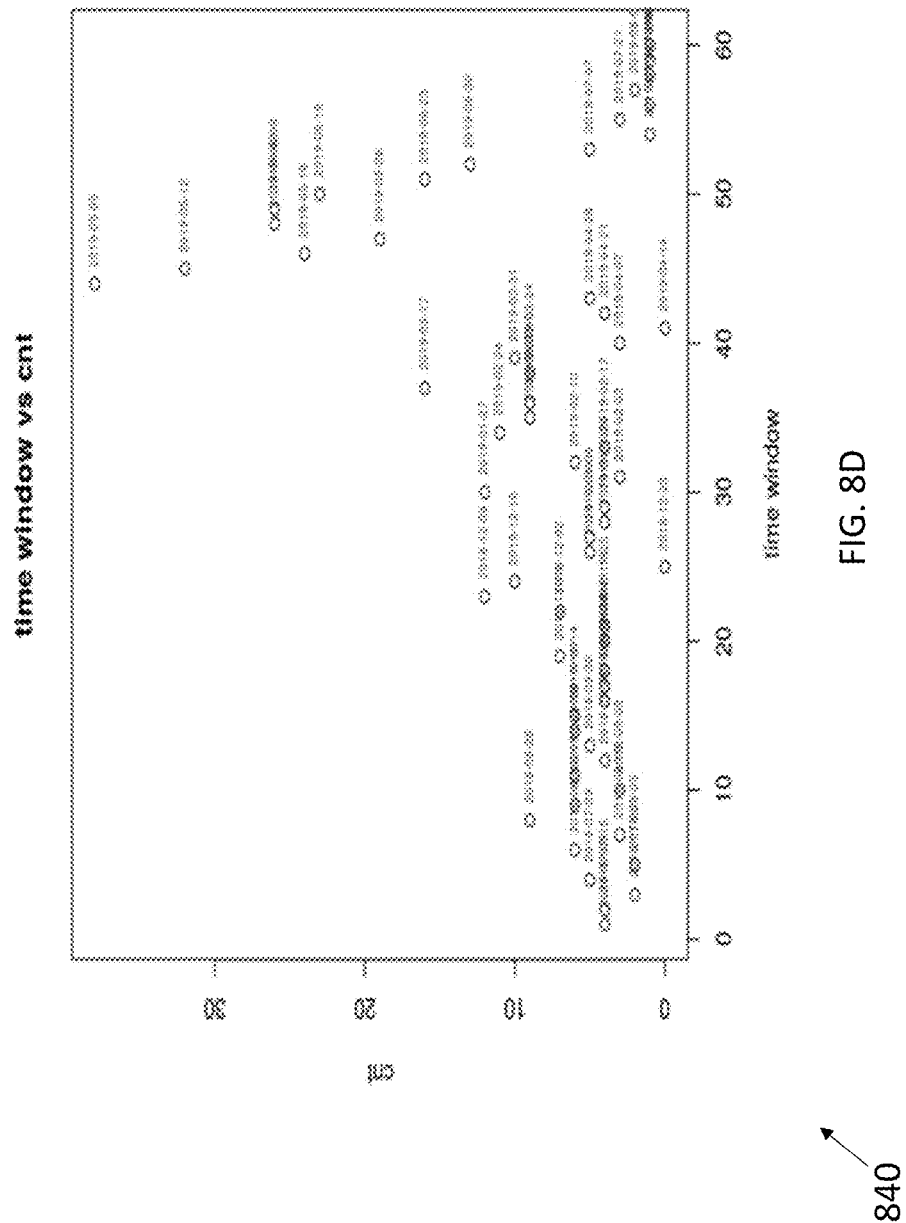
FIG. 8D depicts an example mass count plot.

From the entry of 2019-05-05 to the one of 2019-06-30, all the nine entries are adjacent to each other in terms of time. There is no more entry after 2019-06-30 with the mass count greater than the median of the original mass count list, even though the list ended at the slice of 2019-08-25. Therefore, we claim the ending date of the compromise event is in the slice of 2019-06-30. This compromise event has a clear ending date. It might start on 2019-04-29 and end on 2019-06-30. All cards that had transactions at the merchant during this time period could be the victims of the compromise event. FIG. 8D depicts an example mass count plot 840. The mass count plot 840 of the compromise event shows the time slices from 2018-07-08 to 2019-08-25.

In the mass count plot 840, most of the mass counts of recent time slices at lower right corner are lower than those at lower left corner. At the upper right area of the plot, the time slices from 2019-05-05 to 2019-06-30 with the highest mass counts clustered together, which indicate the time window of the compromise event.

From the two examples, the decision rules of using the mass count list and mass count plot (e.g., mass count plot 810, mass count plot 840) can be summarized as follows:

The starting date of the compromise window is either in the time slice with the highest mass count, or in one of the preceding slices once there is no time gap among the slices and all the slices in between having mass count greater than the median of the list.

The ending date of the compromise window could be the last observation date, especially when there are frequent late recent slices with high mass counts greater than the median of the list. Alternatively, the ending date could be before the last observation date. It would be after the starting date and within one the following slices, without any time gap, whose mass counts are all greater than the median of the list.

When a credit card is determined to be compromised, the card issuer may reissue a new card to the card holder. The card holder may not reactivate the new card, meaning the card holder abandons the new card. Even if the card holder reactivates it, the card holder may significantly reduce the transaction frequencies and amounts using the new card. Therefore, the card issuer might lose a valuable customer or have reduced revenue. In weighing the risks, certain cases may call for reissue while other cases may not. By way of example, when a compromise event has 100 compromised cards detected by the methods proposed in the above sections, and 20 of them already committed to fraud, it might be a good idea for the card issuer to take a prompt action to replace the remaining 80 cards even if they haven't had any fraud transactions yet. However, when an event has 1000 compromised cards, and only 50 of them have committed to fraud, the card issuer might have to consider the balance between the reactivation rate and the severity level of the compromise event. To identify the best cases for reissue, the system can reissue score to each of the compromised cards based on the severity level of the compromise event and the transaction characteristics of the cards so that the card issuer can only reissue new cards to those with high scores.

In some embodiments, the system uses the POC and PAI values to quantify the severity level of the compromise event. As the POC and PAI values increase when entering a new monitoring interval, the associated reissue scores will be getting higher as well, which means more cards need to be considered for replacement. In some embodiments, the system uses the CFI for reissue strategy as well. To determine the other modeling features, the system can select one month most recent transaction records of each compromised card that occurred at least one week prior to the initial interval ending date. For example, the system chooses the following features: the number of merchants where the card had transactions; the number of states where the card had transactions; the last transaction amount; the average risk score; the last visa risk code; the average visa risk code; the customer bin; the number of days since the card opened; the number of days since the card issued last time; and the number of swiped card transactions.

Among the features, only the customer-bins feature is categorical, while the others are numeric. As the reissue score model is built for each individual compromise event, all the cards in the event share the same POC & PAI values at the same interval. To obtain variations of the POC & PAI values, the system repeats the initial feature set 5-6 times, each time assigned with the POC & PAI values and the fraud labels of a different time interval. Then the system stacks all the sets together as a single training set.

Figure 9A:
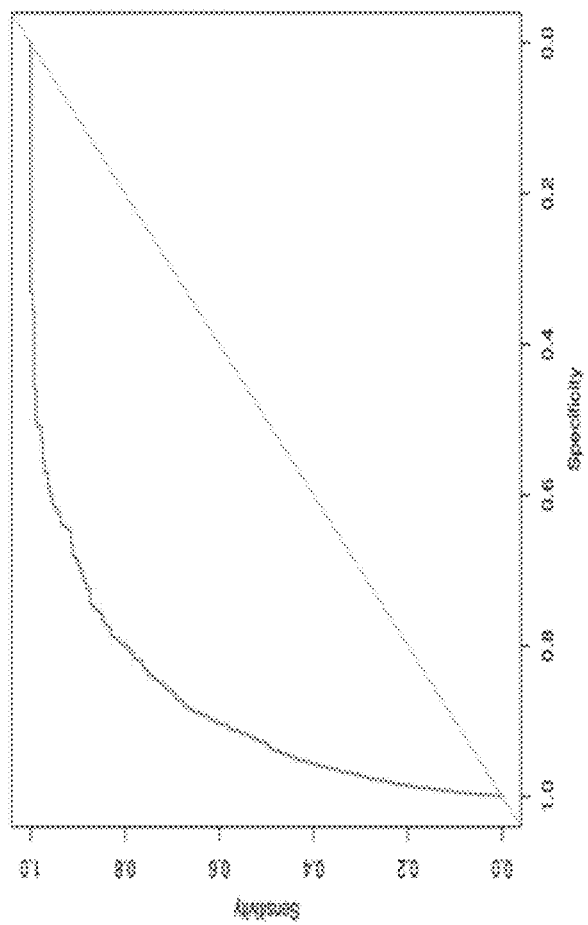
FIG. 9A is an example area under the curve (AUC) plot of a training set.
Figure 9B:
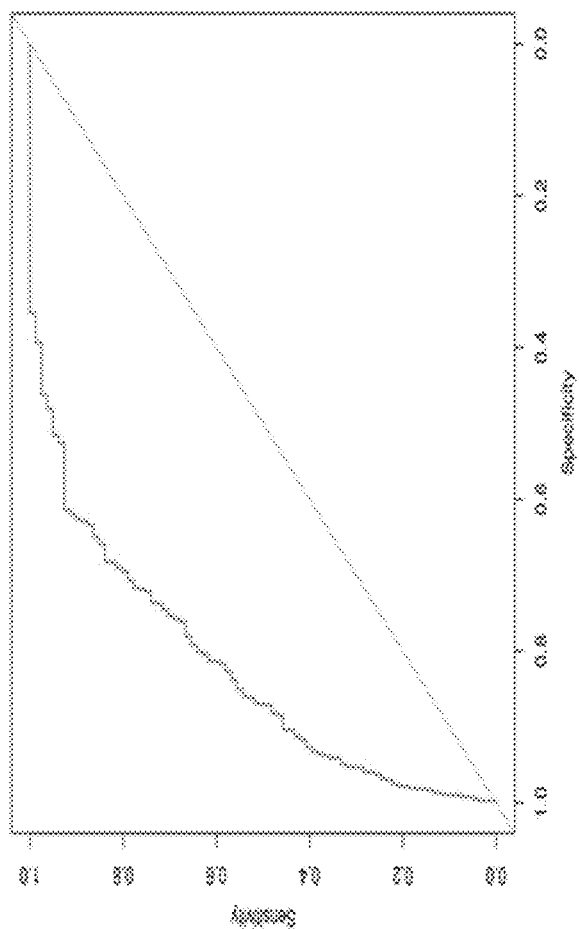
FIG. 9B is an example AUC plot of a testing set.

FIG. 9A is an area under the curve (AUC) plot 910 of a training set with AUC value of 0.89. FIG. 9B is an AUC plot 920 of a testing set with AUC value of 0.83. The two plots show the reissue score model can predict the probability of a card used in fraud transactions in the coming time intervals. Thus, the card issuer can reissue new cards to those card holders to stop potential losses, and the cards with low reissue scores won't get a unnecessary new card.

Figure 10:
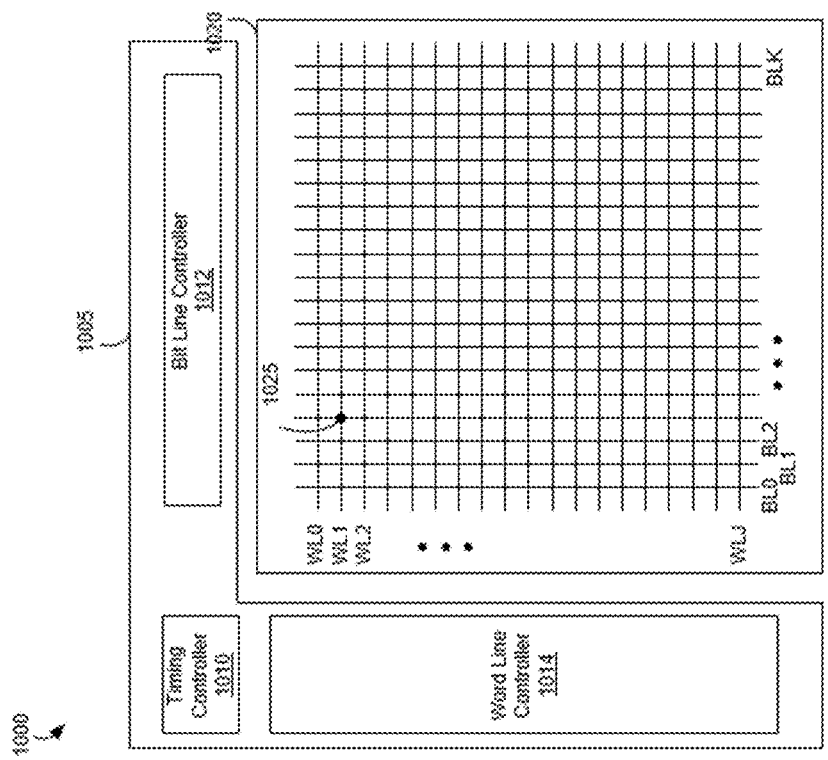
FIG. 10 is an example diagram of a memory device.

FIG. 10 is a diagram of a memory device 1000, in accordance with one embodiment. In some embodiments, the memory device 1000 includes a memory controller 1005 and a memory array 1020. The memory array 1020 may include a plurality of storage circuits or memory cells 1025 arranged in two- or three-dimensional arrays. Each memory cell 1025 may be coupled to a corresponding word line WL and a corresponding bit line BL. The memory controller 1005 may write data to or read data from the memory array 1020 according to electrical signals through word lines WL and bit lines BL. In other embodiments, the memory device 1000 includes more, fewer, or different components than shown in FIG. 10.

The memory array 1020 is a hardware component that stores data. In some embodiments, the memory array 1020 is embodied as a semiconductor memory device. The memory array 1020 includes a plurality of storage circuits or memory cells 1025. The memory array 1020 includes word lines WL0, WL1 . . . WLJ, each extending in a first direction (e.g., X-direction) and bit lines BL0, BL1 . . . BLK, each extending in a second direction (e.g., Y-direction). The word lines WL and the bit lines BL may be conductive metals or conductive rails. In some embodiments, each memory cell 1025 is coupled to a corresponding word line WL and a corresponding bit line, and can be operated according to voltages or currents through the corresponding word line WL and the corresponding bit line BL. In some embodiments, the memory array 1020 includes additional lines (e.g., select lines, reference lines, reference control lines, power rails, etc.).

In some embodiments, each word line WL corresponds to a transaction card (e.g., transaction cards 301, 302, 303, and 304) and each BL corresponds to a points-of-sale device (e.g., point-of-sale devices 311, 312, and 313). A memory cell that stores a one (e.g., a high voltage level, VDD, supply voltage, etc.) indicates an event (e.g., a fraud transaction, a non-fraud transaction occurring before a latest fraud transaction, etc.) for the transaction card corresponding to the memory cell's WL at the point-of-sale device/location corresponding to the memory cell's BL. A memory cell that stores a zero (e.g., a low voltage level, zero volts, ground voltage, etc.) indicates that no such event occurred. In some embodiments, the memory cell can store more than two states (e.g., the memory cell can store 4 states, wherein a one indicates only one event has occurred, a two indicates two events have occurred, and a three indicates that three or more events have occurred). In some embodiments, an indication of multiple events can be stored by assigning multiple BLs to one point-of-sale device (and/or assigning multiple WLs to one transaction card). For example, first point-of-sale device is assigned three BLs (BL1, BL2, and BL3), that are a binary representation of the number of events for a given transaction card at the first point-of-sale device. If a first card transaction has one event at the first point-of-sale device, a one is stored for BL1, a zero is stored for BL2, and a zero is stored for BL3, if the first card transaction has three events at the first point-of-sale device, a one is stored for BL1, a one is stored for BL2, and a zero is stored for BL3, if the first card transaction has two events at the first point-of-sale device, a zero is stored for BL1, a one is stored for BL2, and a zero is stored for BL3, etc.

In some embodiments, the information regarding suspicious fraud activity is stored in one of multiple tiers of storage. Information that is more likely to be processed in real-time can be stored in a faster storage technology ($1^{st}$ tier), such as SRAM, RAM, or a faster version of flash such solid-state drive (SSD), and information that is less likely to be processed in real-time (archived information) is stored in a slower storage technology ($2^{nd}$ tier), such as DRAM, read-only memory (ROM), or a slower version of flash such as hard disk drive (HDD). For example, the most recent (e.g., the last 3 months of) information regarding suspicious fraud activity is stored in a faster storage technology, and the remainder is stored in a slower storage technology. In another example, the post-processed information (e.g., the POC, PAI, and CFI) is stored in the faster storage technology, and the raw information (e.g., the number of events for a given card and location) is stored in the slower storage technology.

The memory controller 1050 is a hardware component that controls operations of the memory array 1020. In some embodiments, the memory array 1020 includes a bit line controller 1012, a word line controller 1014, and a timing controller 1010. In one configuration, the word line controller 1014 is a circuit that provides a voltage or a current through one or more word lines WL of the memory array 1020, and the bit line controller 1012 is a circuit that provides or senses a voltage or current through one or more bit lines BL of the memory array 1020. In one configuration, the timing controller 1010 is a circuit that provides control signals or clock signals to synchronize operations of the bit line controller 1012 and the word line controller 1014. The bit line controller 1012 may be coupled to bit lines BL of the memory array 1020, and the word line controller 1014 may be coupled to word lines WL of the memory array 1020. In one example, to write data to a memory cell 1025, the word line controller 1014 provides a voltage or current to the memory cell 1025 through a word line WL coupled to the memory cell 1025, and applies a bias voltage to the memory cell 1025 through a bit line BL coupled to the memory cell 1025. In one example, to read data from a memory cell 1025, the word line controller 1014 provides a voltage or current to the memory cell 1025 through a word line WL coupled to the memory cell 1025, and senses a voltage or current corresponding to data stored by the memory cell 1025 through a bit line coupled to the memory cell 1025. In some embodiments, the memory controller 1005 includes more, fewer, or different components than shown in FIG. 10.

Figure 11:
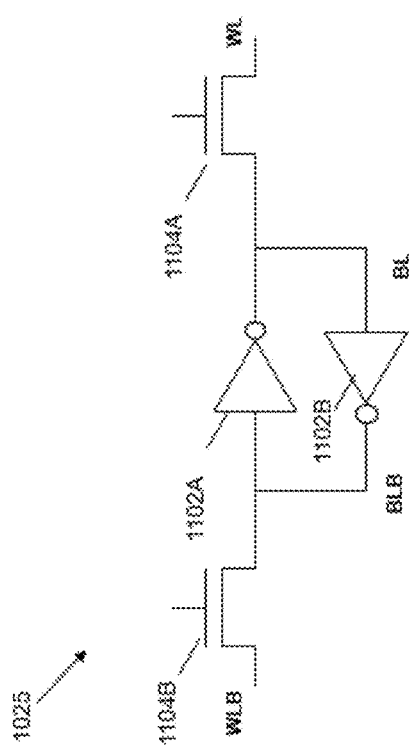
FIG. 11 is an example circuit diagram of the memory cell.

FIG. 11 is an example circuit diagram of the memory cell 1025. As shown in FIG. 6A, the memory cell 1025 includes cross-coupled inverters 1102A-1102B, a bit line (BL) at the output of the inverter 1102A, a transmission gate 1104A coupling the BL to a word line WL, a bit line bar (BLB) at the output of the inverter 1102B, a transmission gate 1104B coupling the BLB to a word line bar WLB. In some embodiments, a first voltage of the weight bit is stored on the BL. In some embodiments, a second voltage of the weight bit is stored on the BLB. In some embodiments, the second voltage is generated at the output of the inverter 1102B in response to the first voltage being at the input of the inverter 1102B. In some embodiments, the memory cell 1025 includes a six-transistor (6T) static random access memory (SRAM) cell (e.g., cell core), a two-transistor-two-resistor (2T-2R) SRAM cell, a four-transistor (4T)-SRAM cell, an eight-transistor (8T)-SRAM cell, a ten-transistor (10T)-SRAM cell, a dynamic random access memory (DRAM) cell, and other types of memory cells that are suitable for use within a memory array, some of which are enumerated in FIG. 12.

Figure 12:
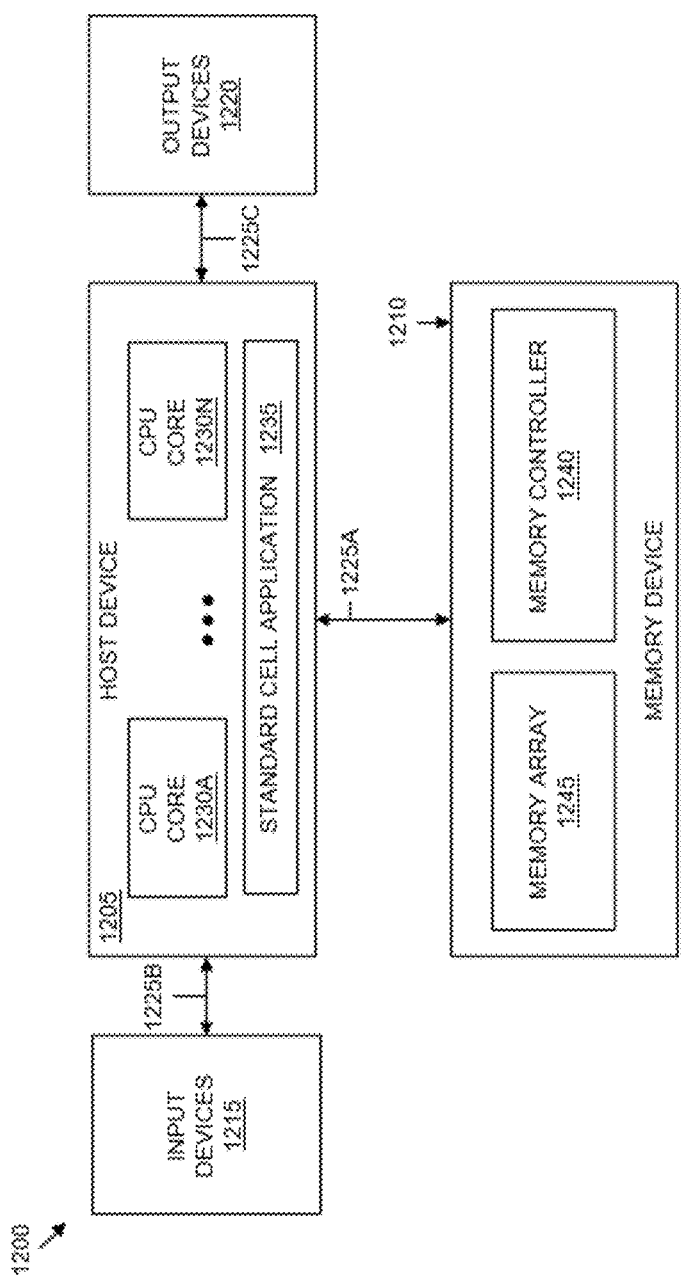
FIG. 12 is an example block diagram of a computing system.

Referring now to FIG. 12, an example block diagram of a computing system 1200 is shown, in accordance with some embodiments of the disclosure. The computing system 1200 may be used by a circuit or layout designer for integrated circuit design. A "circuit" as used herein is an interconnection of electrical components such as resistors, transistors, switches, batteries, inductors, or other types of semiconductor devices configured for implementing a desired functionality. The computing system 1200 includes a host device 1205 associated with a memory device 1210. The host device 1205 may be configured to receive input from one or more input devices 1215 and provide output to one or more output devices 1220. The host device 1205 may be configured to communicate with the memory device 1210, the input devices 1215, and the output devices 1220 via appropriate interfaces 1225A, 1225B, and 1225C, respectively. The computing system 1200 may be implemented in a variety of computing devices such as computers (e.g., desktop, laptop, servers, data centers, etc.), tablets, personal digital assistants, mobile devices, other handheld or portable devices, or any other computing unit suitable for performing schematic design and/or layout design using the host device 1205.

The input devices 1215 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 1205 and that allows an external source, such as a user (e.g., a circuit or layout designer), to enter information (e.g., data) into the host device and send instructions to the host device. Similarly, the output devices 1220 may include a variety of output technologies such as external memories, printers, speakers, displays, microphones, light emitting diodes, headphones, video devices, and any other output peripherals that are configured to receive information (e.g., data) from the host device 1205. The "data" that is either input into the host device 1205 and/or output from the host device may include any of a variety of textual data, circuit data, signal data, semiconductor device data, graphical data, combinations thereof, or other types of analog and/or digital data that is suitable for processing using the computing system 1200.

The host device 1205 includes or is associated with one or more processing units/processors, such as Central Processing Unit ("CPU") cores 1230A-1230N. The CPU cores 1230A-1230N may be implemented as an Application Specific Integrated Circuit ("ASIC"), Field Programmable Gate Array ("FPGA"), or any other type of processing unit. Each of the CPU cores 1230A-1230N may be configured to execute instructions for running one or more applications of the host device 1205. In some embodiments, the instructions and data to run the one or more applications may be stored within the memory device 1210. The host device 1205 may also be configured to store the results of running the one or more applications within the memory device 1210. Thus, the host device 1205 may be configured to request the memory device 1210 to perform a variety of operations. For example, the host device 1205 may request the memory device 1210 to read data, write data, update or delete data, and/or perform management or other operations. One such application that the host device 1205 may be configured to run may be a standard cell application 1235. The standard cell application 1235 may be part of a computer aided design or electronic design automation software suite that may be used by a user of the host device 1205 to use, create, or modify a standard cell of a circuit. In some embodiments, the instructions to execute or run the standard cell application 1235 may be stored within the memory device 1210. The standard cell application 1235 may be executed by one or more of the CPU cores 1230A-1230N using the instructions associated with the standard cell application from the memory device 1210. In one example, the standard cell application 1235 allows a user to utilize pre-generated schematic and/or layout designs of the memory device 100 or a portion of the memory device 100 to aid integrated circuit design. After the layout design of the integrated circuit is complete, multiples of the integrated circuit, for example, including the memory device 100 or a portion of the memory device 100 can be fabricated according to the layout design by a fabrication facility.

Referring still to FIG. 12, the memory device 1210 includes a memory controller 1240 that is configured to read data from or write data to a memory array 1245. The memory array 1245 may include a variety of volatile and/or non-volatile memories. For example, in some embodiments, the memory array 1245 may include NAND flash memory cores. In other embodiments, the memory array 1245 may include NOR flash memory cores, SRAM cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array. The memories within the memory array 1245 may be individually and independently controlled by the memory controller 1240. In other words, the memory controller 1240 may be configured to communicate with each memory within the memory array 1245 individually and independently. By communicating with the memory array 1245, the memory controller 1240 may be configured to read data from or write data to the memory array in response to instructions received from the host device 1205. Although shown as being part of the memory device 1210, in some embodiments, the memory controller 1240 may be part of the host device 1205 or part of another component of the computing system 1200 and associated with the memory device. The memory controller 1240 may be implemented as a logic circuit in either software, hardware, firmware, or combination thereof to perform the functions described herein. For example, in some embodiments, the memory controller 1240 may be configured to retrieve the instructions associated with the standard cell application 1235 stored in the memory array 1245 of the memory device 1210 upon receiving a request from the host device 1205.

It is to be understood that only some components of the computing system 1200 are shown and described in FIG. 12. However, the computing system 1200 may include other components such as various batteries and power sources, networking interfaces, routers, switches, external memory systems, controllers, etc. Generally speaking, the computing system 1200 may include any of a variety of hardware, software, and/or firmware components that are needed or considered desirable in performing the functions described herein. Similarly, the host device 1205, the input devices 1215, the output devices 1220, and the memory device 1210 including the memory controller 1240 and the memory array 1245 may include other hardware, software, and/or firmware components that are considered necessary or desirable in performing the functions described herein.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   a processor having programmed instructions stored in memory that when executed cause the processor to:
   receive, via a communication network, information regarding suspicious fraud activity at a first location involving a plurality of transaction cards;
   monitor changes over a first time interval to received information regarding suspicious fraud activity at the first location, wherein to monitor includes to increment a different counter stored in memory for each of the plurality of transaction cards that performed a fraudulent transaction at a second location subsequent to performing a non-fraudulent transaction at the first location during the first time interval;
   identify a point-of-compromise (POC) location based on monitored changes surpassing a threshold indicating suspicious fraud activity at the first location over the first time interval;
   responsive to identifying the POC location, determine a number of transaction cards having suspicious fraud activity at the POC location for each of a plurality of time slices of the first time interval;
   identify an initial POC time slice that has a highest number of transaction cards having suspicious fraud activity of the plurality of time slices;
   determine an end POC time slice after the initial POC time slice based on the end POC time slice being the first time slice after the initial POC time slice having a number of transaction cards having suspicious fraud activity below a value determined from a number of transaction cards having suspicious fraud activity of the plurality of time slices, wherein a time period beginning at the initial POC time slice and ending at the end POC time slice is a window of compromise;
   determine one or more transaction cards of the plurality of transaction cards that performed non-fraudulent transactions at the POC location during the first time interval but outside and not within the window of compromise between the initial POC time slice and the end POC time slice; and
   responsive to the determination of the one or more transaction cards that performed non-fraudulent transactions at the POC location during the first time interval but outside and not within the window of compromise between the initial POC time slice and the end POC time slice, remove the incremented counter for each of the one or more transaction cards from the memory.

2. The apparatus of claim 1, wherein the programmed instructions, when executed, further cause the processor to:
   arrange the received information regarding suspicious fraud activity at a plurality of locations over the first time interval into a first two-dimensional matrix including suspicious fraud transaction information, the plurality of locations, and the plurality of transaction cards.

3. The apparatus of claim 2, wherein the programmed instructions, when executed, further cause the processor to:
   provide recommended POC locations by filtering out merchant locations associated with selected merchants.

4. The apparatus of claim 2, wherein the programmed instructions, when executed, further cause the processor to:
   provide recommended POC locations by grouping merchants based on merchant segments and applying segment metrics to the grouped merchants.

5. The apparatus of claim 1, wherein the programmed instructions, when executed, further cause the processor to:
   send a reissue instruction to reissue cards for the plurality of transaction cards used at the POC location.

6. The apparatus of claim 5, wherein the programmed instructions, when executed, further cause the processor to:
   before sending a reissue instruction, determine a severity level of a compromise event and sending a corrected reissue instruction to reissue cards for cards in the plurality of transaction cards having a reissue score exceeding a threshold.

7. The apparatus of claim 2, wherein the two-dimensional matrix is implemented as a static random access memory (SRAM) array.

8. The apparatus of claim 1, wherein the programmed instructions, when executed, further cause the processor to:
filter out locations associated with selected merchants; or
provide recommended POC locations by grouping merchants based on merchant segments and applying segment metrics to the grouped merchants.

9. The apparatus of claim 1, wherein the programmed instructions, when executed, further cause the processor to:
for each respective card of the plurality of transaction cards used at the POC location, send an alert to an issuer of the respective card.

10. The apparatus of claim 1, wherein the programmed instructions, when executed, further cause the processor to:
identify that the POC location has an acceleration indicator that surpasses a threshold, wherein the acceleration indicator is based on a change in number of fraudulent cards per time interval used at the POC location.

11. The apparatus of claim 1, wherein the programmed instructions, when executed, further cause the processor to:
arrange the received information regarding suspicious fraud activity at a plurality of locations over the first time interval into a first matrix including suspicious fraud transaction information, the plurality of locations, and the plurality of transaction cards.

12. The apparatus of claim 11, wherein the programmed instructions, when executed, further cause the processor to:
create a second matrix corresponding to an update time interval,
wherein to create the second matrix includes to update data of the first matrix with collected data for the update time interval.

13. The apparatus of claim 12, wherein to update the data of the first matrix includes to:
determine whether new fraudulent transactions occurred during the update time interval;
responsive to determining that no new fraudulent transactions occurred during the update time interval, updating data for total card transactions only for locations which have had previous fraudulent or suspicious activity; and
responsive to determining that new fraudulent transactions occurred during the update time interval, updating based on a location associated with the new fraudulent transactions.

14. The apparatus of claim 1, wherein the programmed instructions, when executed, further cause the processor to:
calculate a reissue score that reflects a probability of a reissue candidate transaction card being used in fraud transactions in future time intervals based on a similarity of usage of the reissue candidate transaction card and at least one of the plurality of transaction cards;
responsive to the reissue score exceeding a predetermined reissue score, indicating that the reissue candidate transaction card should be reissued.

15. A computerized method comprising:
collecting, by a computer processor, location data for suspicious fraud transactions involving a plurality of transaction cards at a first location over a first time window;
constructing, by the computer processor, a three-dimensional matrix using collected locations and associated transaction cards over a plurality of time windows, wherein the constructing includes:
incrementing a different counter for each of the plurality of transaction cards that performed a fraudulent transaction at a second location subsequent to performing a non-fraudulent transaction at the first location during the first time window; and
inserting the incremented counters into separate rows of the three-dimensional matrix that each corresponds to a different transaction card of the plurality of transaction cards;
updating, by the computer processor, indicators in the three-dimensional matrix after each new time window;
generating, by the computer processor, from indicators in the three-dimensional matrix at each update a candidate point-of-compromise (POC) location;
responsive to identifying the POC location, determining, by the computer processor, a number of transaction cards having suspicious fraud activity at the POC location for each of a plurality of time slices of the first time window;
identifying, by the computer processor, an initial POC time slice that has a highest number of transaction cards having suspicious fraud activity of the plurality of time slices;
determining, by the computer processor, an end POC time slice after the initial POC time slice based on the end POC time slice being the first time slice after the initial POC time slice having a number of transaction cards having suspicious fraud activity below a value determined from a number of transaction cards having suspicious fraud activity of the plurality of time slices, wherein a time period beginning at the initial POC time slice and ending at the end POC time slice is a window of compromise;
determine one or more transaction cards of the plurality of transaction cards that performed non-fraudulent transactions at the POC location during the first time window but outside and not within the window of compromise between the initial POC time slice and the end POC time slice; and
responsive to the determination of the one or more transaction cards that performed non-fraudulent transactions at the POC location during the first time window but outside and not within the window of compromise between the initial POC time slice and the end POC time slice, remove each row containing an incremented counter for one of the one or more transaction cards from the three-dimensional matrix.

16. The method of claim 15, further comprising providing recommended POC locations by filtering out merchant locations associated with selected merchants.

17. The method of claim 15, further comprising sending a reissue instruction to reissue cards for the plurality of transaction cards used at the POC location.

18. The method of claim 15, wherein the three-dimensional matrix is implemented as one or more static random access memory (SRAM) arrays.

19. A non-transitory computer readable media with computer-executable instructions embodied thereon that, when executed by a processor of a system, cause the system to perform a process comprising:
collecting location data for suspicious fraud transactions involving a plurality of transaction cards at a first location over a first time window;
constructing a three-dimensional data structure using collected locations and associated transaction cards over a plurality of time windows, wherein the constructing includes:
incrementing a different counter for each of the plurality of transaction cards that performed a fraudulent transaction at a second location subsequent to performing a non-fraudulent transaction at the first location during the first time window; and inserting the incremented counters into separate rows of the three-dimensional matrix that each corresponds to a different transaction card of the plurality of transaction cards;

updating indicators in the three-dimensional data structure after each new time window;

generating from indicators in the three-dimensional data structure at each update a candidate point-of-compromise (POC) location;

responsive to identifying the POC location, determining a number of transaction cards having suspicious fraud activity at the POC location for each of a plurality of time slices of the first time window;

identifying a POC time slice that has a highest number of transaction cards having suspicious fraud activity of the plurality of time slices;

determining an end POC time slice after the initial POC time slice based on the end POC time slice being the first time slice after the initial POC time slice having a number of transaction cards having suspicious fraud activity below a value determined from a number of transaction cards having suspicious fraud activity of the plurality of time slices, wherein a time period beginning at the initial POC time slice and ending at the end POC time slice is a window of compromise;

determine one or more transaction cards of the plurality of transaction cards that performed non-fraudulent transactions at the POC location during the first time window but outside and not within the window of compromise between the initial POC time slice and the end POC time slice; and responsive to the determination of the one or more transaction cards that performed non-fraudulent transactions at the POC location during the first time window but outside and not within the window of compromise between the initial POC time slice and the end POC time slice, remove each row containing an incremented counter for one of the one or more transaction cards from the three-dimensional matrix.

20. The media of claim 19, wherein the three-dimensional data structure is implemented as one or more static random access memory (SRAM) arrays.

* * * * *